United States Patent
Novotny et al.

(10) Patent No.: US 10,797,637 B2
(45) Date of Patent: Oct. 6, 2020

(54) SYSTEM AND METHOD FOR DEBRIS REMOVAL

(71) Applicant: SNOLAR TECHNOLOGIES LTD., Toronto (CA)

(72) Inventors: Peter R. Novotny, Toronto (CA); Layne Kulchecki, Kitchener (CA)

(73) Assignee: Snolar Technologies Ltd., Toronto, Ontario (CA)

( * ) Notice: Subject to any disclaimer, the term of this patent is extended or adjusted under 35 U.S.C. 154(b) by 0 days.

(21) Appl. No.: 16/346,314

(22) PCT Filed: Oct. 31, 2017

(86) PCT No.: PCT/IB2017/056773
§ 371 (c)(1),
(2) Date: Apr. 30, 2019

(87) PCT Pub. No.: WO2018/083598
PCT Pub. Date: May 11, 2018

(65) Prior Publication Data
US 2019/0280647 A1    Sep. 12, 2019

Related U.S. Application Data

(60) Provisional application No. 62/533,196, filed on Jul. 17, 2017, provisional application No. 62/415,714, filed on Nov. 1, 2016.

(51) Int. Cl.
*H02S 40/12*    (2014.01)
*B08B 5/02*    (2006.01)
(Continued)

(52) U.S. Cl.
CPC ............... *H02S 40/12* (2014.12); *B08B 5/02* (2013.01); *E01H 5/067* (2013.01); *H02S 40/10* (2014.12)

(58) Field of Classification Search
CPC . B60S 3/04; H02S 40/10; H02S 40/12; E01H 5/067; B08B 5/02
(Continued)

(56) References Cited

U.S. PATENT DOCUMENTS 2,945,254 A * 7/1960 Boissonnault ........ E01H 1/0818
15/328
3,104,406 A * 9/1963 Rhodes ..................... B60S 3/06
15/53.1
(Continued)

FOREIGN PATENT DOCUMENTS

CA    2091619 C    9/1994
CA    2159667 C    7/2006
(Continued)

OTHER PUBLICATIONS

ISA/CA, International Search Report and Written Opinion, dated Feb. 16, 2018, re PCT international Patent Application No. PCT/IB2017/056773.
(Continued)

*Primary Examiner* — Bryan R Muller
(74) *Attorney, Agent, or Firm* — Perry + Currier Inc.; Matthew J. Marquardt

(57) ABSTRACT

A system and method for removing debris from solar modules in a solar module array. The system includes an air supply for providing pressurized air to a debris removal wing, a support art configured to support the debris removal wing proximate a solar module, and a support base fixing the support arm to a vehicle, the vehicle operable to advance the debris removal wing along the solar module array. The debris removal wing includes a first air outlet for directed pressurized air to remove debris from the solar modules. The debris removal wing may include a second air outlet for
(Continued)

directing pressurized air to at least partly hovering the debris removal wing proximate the solar modules.

16 Claims, 18 Drawing Sheets

(51) Int. Cl.
*H02S 40/10* (2014.01)
*E01H 5/06* (2006.01)

(58) Field of Classification Search
USPC .................. 15/340.1, 97.3, 405; 37/196
See application file for complete search history.

(56) References Cited

U.S. PATENT DOCUMENTS

| | | | |
|---|---|---|---|
| 3,174,477 A * | 3/1965 | Wilson | E01H 5/106 |
| | | | 126/271.2 A |
| 3,272,176 A | 9/1966 | Saydlowski | |
| 3,409,995 A * | 11/1968 | Greenwood | B60S 3/002 |
| | | | 34/87 |
| 3,413,041 A | 11/1968 | Moorman | |
| 3,442,027 A * | 5/1969 | Hurwitz | B60S 3/002 |
| | | | 34/571 |
| 5,068,977 A * | 12/1991 | Syori | F26B 21/004 |
| | | | 15/319 |
| 5,557,820 A * | 9/1996 | Belanger | B08B 5/023 |
| | | | 15/1.51 |
| 6,202,329 B1 | 3/2001 | Supplee et al. | |
| 8,382,013 B2 | 2/2013 | Pucciani | |
| 8,857,451 B2 * | 10/2014 | Opdyke | B08B 5/023 |
| | | | 134/103.2 |
| 9,060,659 B2 * | 6/2015 | Lu | A47L 9/009 |
| 9,130,502 B1 | 9/2015 | Aly et al. | |
| 9,676,372 B2 * | 6/2017 | Roth | B60S 3/00 |
| 2011/0056924 A1 | 3/2011 | Townsend | |
| 2012/0216369 A1 | 8/2012 | Vinci | |
| 2014/0041713 A1 | 2/2014 | Adler et al. | |
| 2014/0220879 A1 * | 8/2014 | Krueger | B08B 5/02 |
| | | | 454/305 |
| 2016/0178241 A1 * | 6/2016 | Jeanty | F24S 40/20 |
| | | | 15/250.003 |
| 2017/0272030 A1 * | 9/2017 | Chow | H02S 40/12 |
| 2019/0006985 A1 * | 1/2019 | Twisselman | H02S 40/10 |

FOREIGN PATENT DOCUMENTS

| | | |
|---|---|---|
| CA | 2327438 C | 10/2007 |
| CN | 102437221 A | 5/2012 |
| CN | 203900024 U | 10/2014 |
| CN | 104506127 A | 4/2015 |
| CN | 105234115 A | 1/2016 |
| CN | 103986411 B | 2/2016 |
| CN | 106002951 A | 10/2016 |
| DE | 20201105107 U1 | 12/2011 |
| JP | 2010161144 A | 7/2010 |
| JP | 2015192980 A | 11/2015 |
| JP | 2016078013 A | 5/2016 |
| KR | 101623460 B1 | 5/2016 |

OTHER PUBLICATIONS

Mondal, AK, and Bansal, K. "A brief history and future aspects in automatic cleaning systems for solar photovoltaic panels." Advanced Robotics 29.8 (2015): 515-524.
CNIPA, First Office Action, dated Jan. 6, 2020, re Chinese Patent Application No. 201780068108.6 [with English translation].
CNIPA, Search Report, dated Dec. 26, 2019, re Chinese Patent Application No. 201780068108.6 [No English translation available].
ISA/CA, International Preliminary Report on Patentability, dated May 16, 2019, re PCT International Patent Application No. PCT/IB2017/056773.
JPO, Reasons for Rejection (with English translation), dated Dec. 7, 2019, re Japanese Patent Application No. 2019-534250.
Buffalo Turbine, Debris & Leaf Blowers webpage. www.buffaloturbine.com. Retrieved from the Internet on Jul. 13, 2016 from URL: <http://buffaloturbine.com/debrisleaf-blowers/>.

* cited by examiner

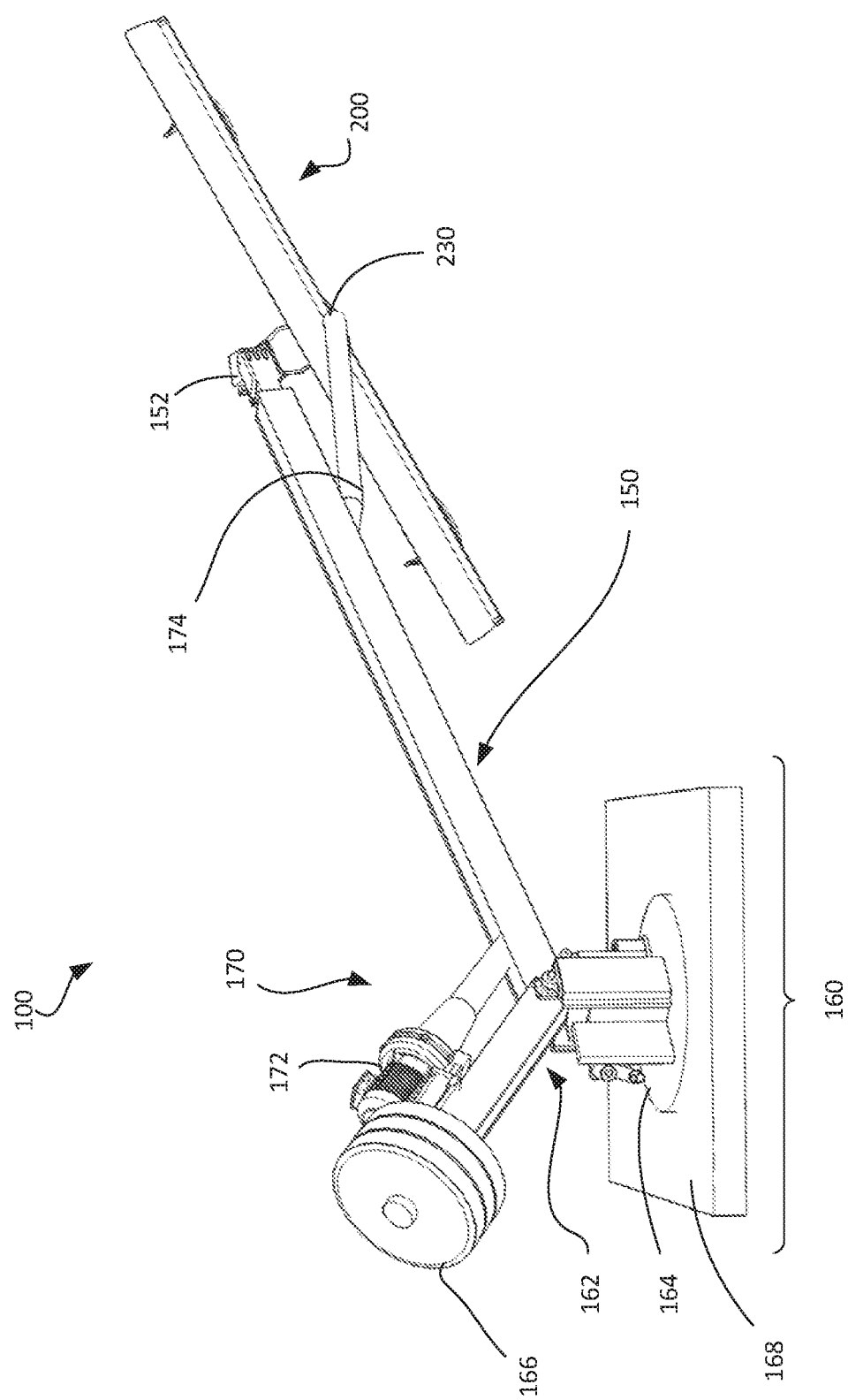

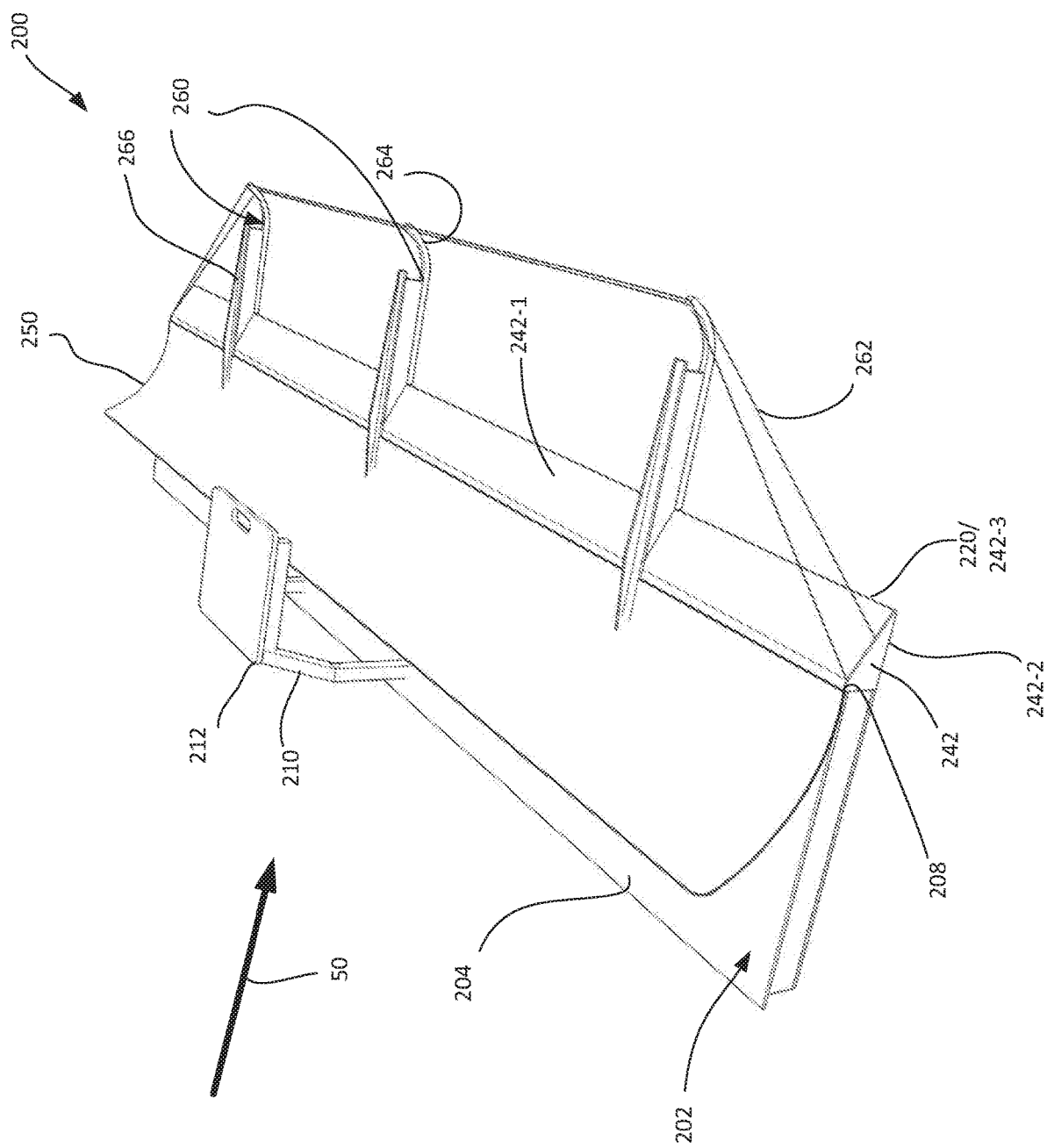

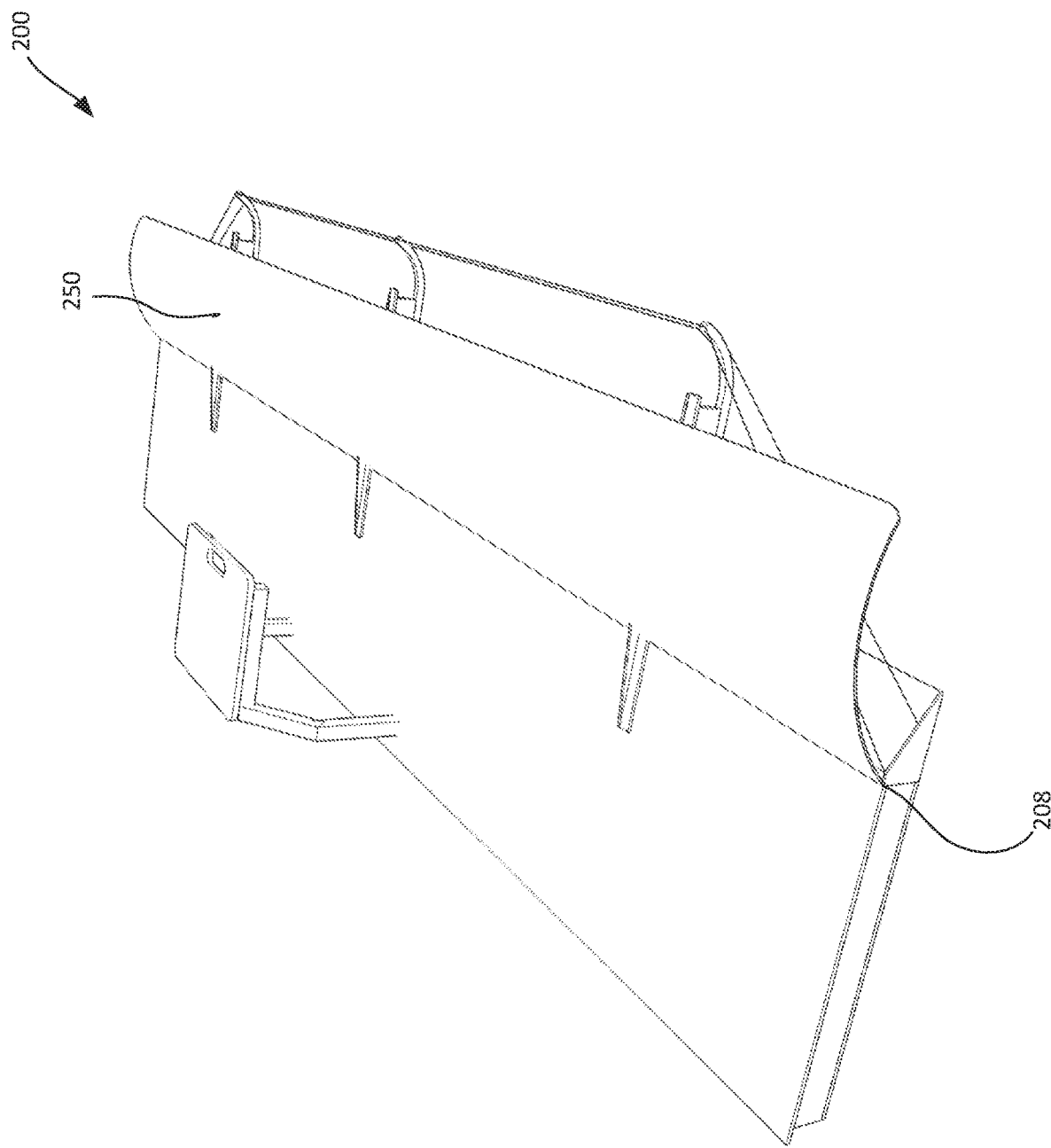

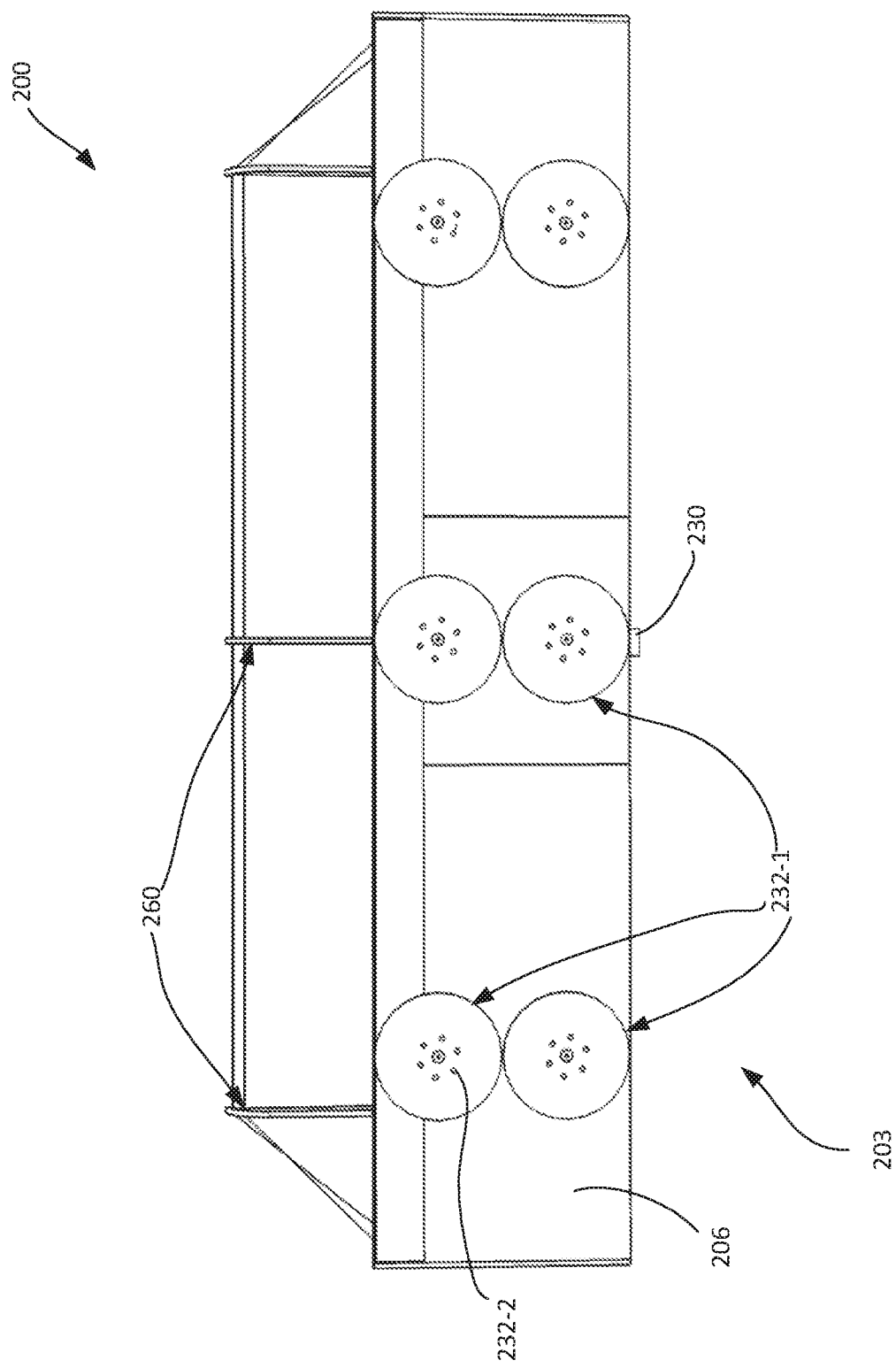

SYSTEM AND METHOD FOR DEBRIS REMOVAL

CROSS-REFERENCE TO RELATED APPLICATIONS

This application claims priority to U.S. Provisional Patent Application No. 62/415,714, filed Nov. 1, 2016, and to U.S. Provisional Patent Application No. 62/533,196, filed Jul. 17, 2017, both of which are incorporated herein by reference in their entirety.

FIELD

The present disclosure relates generally to systems and methods for debris removal, and more particularly, to the removal of debris from solar modules in a solar module array.

BACKGROUND

A solar module's ability to harness solar energy is reduced when covered by debris. Depending on the environment, such problematic debris can include snow, sand, dust, or other debris.

In the case of snow debris, solar modules typically do not operate when covered by about 2-3 cm or more of snow. The snow cover results in loss of revenue for owners of solar power plants, which can be substantial if snow removal is not addressed. In desert regions of the world solar modules may become covered with sand and dust debris, resulting in a similar loss in productivity.

SUMMARY

According to an aspect of the disclosure, a system for removing debris from solar modules in a solar module array includes a debris removal wing having a body having a first side configured to be positioned proximate an operating surface of a target solar module, the body having a leading end portion having a width spanning a working portion of the solar module array, an air inlet in the body configured to receive pressurized air, and a first air outlet in the body configured to direct a first portion of the pressurized air out the leading end portion of the debris removal wing in a blowing direction, the blowing direction including a first vector component parallel with operating surfaces of solar modules of the working portion of the solar module array, an air supply connected to the air inlet configured for providing pressurized air to the debris removal wing, a support arm configured to support the debris removal wing proximate the target solar module, and a support base configured to fix the support arm to a vehicle, the vehicle operable to advance the debris removal wing along the solar module array in a leading direction.

In some implementations, the debris removal wing further includes a second air outlet in the body configured to direct a second portion of the pressurized air out the first side of the body of the debris removal wing toward the operating surface of the target solar module to at least partly hover the debris removal wing proximate the target solar module.

In some implementations, the debris removal wing further includes at least one air caster disposed on the first side of the body, the at least one air caster configured for receiving and directing at least a portion of the second portion of the pressurized air from the second air outlet toward the operating surface of the target solar module to at least partly hover the debris removal wing proximate the operating surface of the target solar module.

In some implementations, the debris removal wing further includes at least one extending member extending from the leading end portion of the body in the leading direction, the at least one extending member having a distal end curved away from the operating surfaces of the solar modules.

In some implementations, the at least one extending member further includes a non-abrasive brush configured to contact operating surfaces of solar modules.

In some implementations, the leading end portion of the body includes a profile tapered in the leading direction.

In some implementations, the first side of the body includes a low-friction surface.

In some implementations, the debris removal wing further includes a flap attached to the body, the flap being adjustable between a blocking position extending past the leading end portion of the body to block blowback of debris from operating surfaces of solar modules of the working portion of the solar module array, and a retracted position extending along the body of the debris removal wing.

In some implementations, the flap includes a low-friction sheet material.

In some implementations, the support base is rotatable to position the debris removal wing on either side of the vehicle.

In some implementations, the support arm includes a control arm for articulating the debris removal wing in at least yaw and roll directions.

In some implementations, the first portion of the pressurized air includes about 85 to about 93 percent of the pressurized air by volume, and wherein the second portion of the pressurized air includes the balance.

In some implementations, the debris includes snow.

In some implementations, the debris removal wing further includes an air plenum, the air plenum in fluid communication with the air inlet, the first air outlet, and the second air outlet.

In some implementations, the blowing direction of the first portion of the pressurized air includes a second vector component perpendicular to operating surfaces of solar modules of the working portion of the solar module array.

In some implementations, the first vector component of the blowing direction is parallel to the leading direction.

According to another aspect of the disclosure, a method for removing debris from solar modules in a solar module array includes maintaining a debris removal wing proximate one of the solar modules in the solar module array, directing pressurized air from the debris removal wing along solar modules of the solar module array in a blowing direction, the blowing direction including a first vector component parallel with operating surfaces of solar modules of the solar module array, wherein the directing the pressurized air is configured to at least partially remove the debris from the solar modules, and advancing the debris removal wing along the solar modules in a leading direction.

In some implementations, maintaining the debris removal wing proximate one of the solar modules includes hovering the debris removal wing with pressurized air.

In some implementations, the method includes articulating the debris removal wing to control alignment of the debris removal wing with operating surfaces of the solar modules in the solar module array.

In some implementations, the method includes blocking blowback of debris from the solar modules using a flap attached to the debris removal wing.

In some implementations, the method includes traversing the debris removal wing across a gap between solar modules using at least one extending member extending from a leading end portion of the debris removal wing.

In some implementations, the advancing the debris removal wing is configured to direct at least a portion of the debris from the solar modules on top of the debris removal wing to allow gravity to slide the debris down the debris removal wing.

In some implementations, the blowing direction includes a second vector component perpendicular to operating surfaces of the solar modules.

In some implementations, the first vector component of the blowing direction is parallel to the leading direction.

Other features and advantages are described below.

BRIEF DESCRIPTION OF THE DRAWINGS

Non-limiting implementations will now be described, by way of example only, with reference to the attached Figures, wherein:

FIG. 2 is a perspective view of a debris removal wing, air supply, support arm, and support base, of the system of FIG. 1;

FIG. 3 is a perspective view of the debris removal wing of the system of FIG. 1, indicating an adjustable flap in a retracted position;

FIG. 4 is a perspective view of the debris removal wing of the system of FIG. 1, indicating the adjustable flap in a blocking position;

FIG. 5 is a perspective view of the debris removal wing of the system of FIG. 1 showing a lower side thereof;

DETAILED DESCRIPTION

Figure 1:
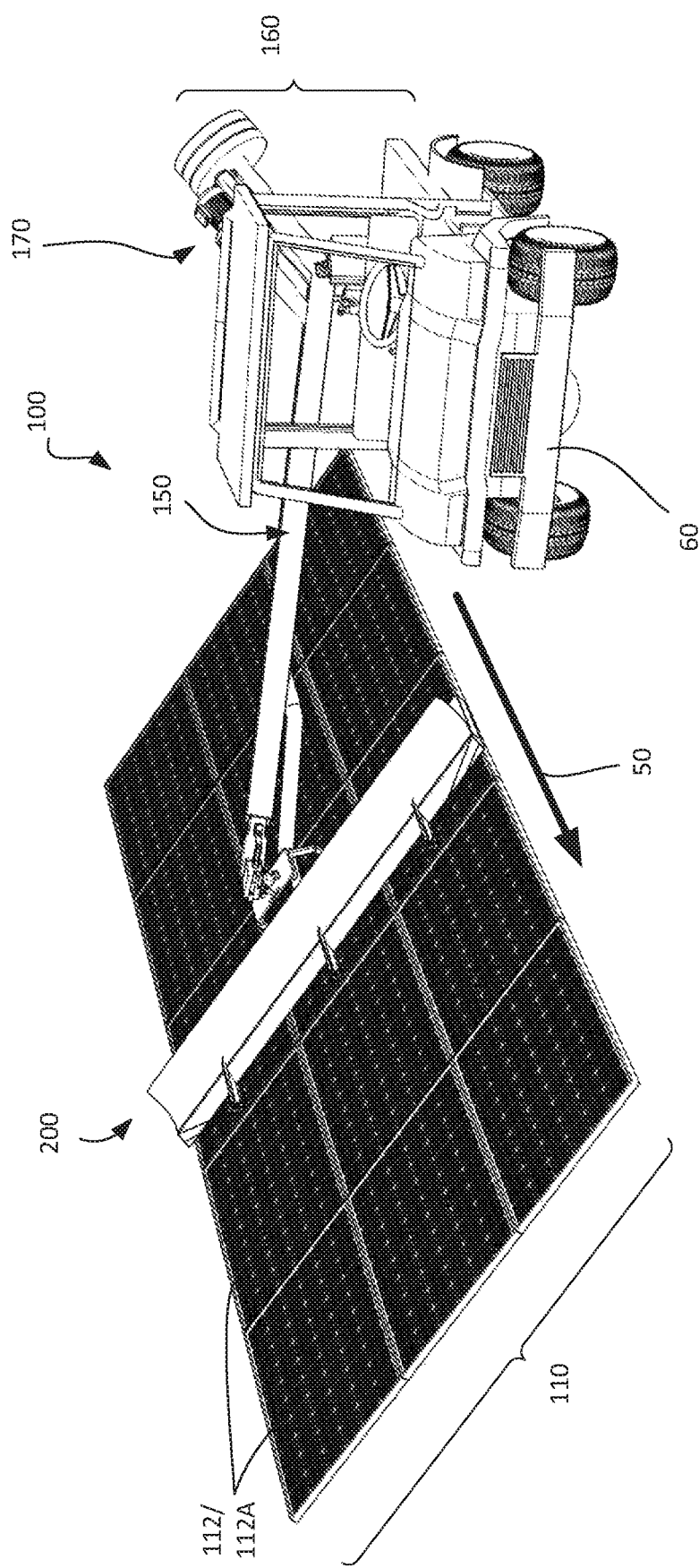
FIG. 1 is a perspective view of a system for removing debris from solar modules in a solar module array.

The present disclosure relates to a system for the removal of debris from a surface, and in particular, to a system for removing debris from solar modules in a solar module array.

According to the present disclosure, the system includes a debris removal wing, a support arm supporting the debris removal wing proximate to a target solar module, a support base configured for fixing the support arm to a vehicle, and an air supply providing pressurized air to the debris removal wing. The debris removal wing directs pressurized air across a working portion of the solar module array, removing debris from the solar modules of the working portion. The vehicle can be driven along the array of solar modules, advancing the debris removal wing across successive solar modules, removing debris from the solar modules as the vehicle advances.

The debris removal wing can direct pressurized air through the lower side of the debris removal wing, hovering the debris removal wing proximate the solar modules, to minimize and/or avoid contact between the lower side of the debris removal wing and operating surfaces of the solar modules.

The debris removing wing can include extending members extending from a leading end portion of the debris removal wing which allow the debris removal wing to traverse gaps between solar modules in the solar module array.

The debris removal wing can include an adjustable flap which can be configured to block blowback of debris removed from the solar modules, or retracted across the body of the debris removal wing to provide a low-friction surface across the debris removal wing.

The support arm can include a control arm allowing adjustment of the debris removal wing in one or more of pitch, yaw, and roll directions for maintaining alignment of the debris removal wing with the solar module arrays during operation. The support base can be rotatable to allow the support arm to be positioned at either side of the vehicle.

Other features and advantages of the system and the debris removal wing are described more fully below, where non-limiting implementations of the system and the debris removal wing are described with reference to the following Figures. For convenience, reference numerals may be repeated (with or without an offset) to indicate analogous components or features.

FIG. 1 is a perspective view of a system 100 for removing debris from solar modules in a solar module array, according to a non-limiting implementation. The system includes a debris removal wing 200, a support arm 150, a support base 160, and an air supply 170.

Also depicted is a solar module array 110, including several solar modules 112, having operating surfaces 112A which are oriented on an incline for generating power from solar energy. Solar modules 112 are typically inclined 20-35 degrees from the horizon, but it is contemplated that the debris removal wing 200 can be used on solar module arrays 110 of varying inclinations.

For convenience, the width of solar module array 110 refers to the shorter dimension of the solar module array 110 in the plane in which solar modules 112 are arranged, and the length of solar module array 110 refers to the longer dimension. In other words, length is the dimension of solar module array 110 along leading direction 50 as shown in FIG. 1, and width is the dimension of solar module array 110 normal to the length. Conversely, the width of debris removal wing 200 refers to the dimension of debris removal wing 200 that spans in the direction of the width of solar module array 110.

Further, the top or upward side of debris removal wing 200 refers to the side of debris removal wing 200 facing away from operating surfaces 112A in operation, as shown in FIG. 1. The bottom, downward, or lower side of debris removal wing 200 refers to the side of debris removal wing 200 configured to face operating surfaces 112A in operation. The front or frontal end of debris removal wing 200 refers to the side of debris removal wing 200 oriented in and/or leading in the leading direction 50. The rear or rearward end of debris removal wing 200 refers to the side of debris removal wing 200 oriented opposite and/or trailing in the leading direction 50.

The system 100 is used to remove debris, such as snow, sand, dust, or other debris, from operating surfaces 112A of the solar modules 112. Operating surfaces are those surfaces which are configured to be exposed to the sunlight. The debris removal wing 200 of the system 100 is shown being positioned proximate to operating surfaces 112A, and spanning a working portion of the solar module array 110.

In the present disclosure, the debris removal wing 200 being proximate to operating surfaces 112A is to be understood to mean that the debris removal wing 200 is sufficiently near the operating surfaces 112A of solar modules 112 to remove debris from the operating surfaces 112A using pressurized air along the operating surfaces 112A, without being so near as to include the body 202 of debris removal wing 200 (defined below in FIG. 3) continuously or substantially continuously contacting the operating surfaces 112A during operation. As will be described in greater detail below, the debris removal wing 200 may be maintained proximate to operating surfaces 112A at least in part by floating over a thin layer or cushion of pressurized air. In some implementations, the debris removal wing 200 may be maintained proximate to operating surfaces 112A at least in part by riding on non-abrasive brushes in contact with operating surfaces 112A, where non-abrasive means suitable for contacting surfaces of solar modules 112 without scratching or otherwise damaging operating surfaces 112A thereof to such an extent that would degrade the performance and/or productivity of the solar modules. In some implementations, the body 202 of debris removal wing 200 may be maintained variously at about 20 cm, 15 cm, 10 cm, 5 cm, 3 cm, or nearer, to operating surfaces 112A.

In the present disclosure, the term working portion is to be understood to refer to the portion of the solar module array 110 containing solar modules 112 with which the debris removal wing 200 is engaged in removing debris. More particularly, the working portion includes the solar modules 112 in range of the pressurized air delivered from debris removal wing 200. For example, in the present implementation, the debris removal wing 200 is shown as having a width spanning about the width of the solar module array 110, providing a working portion similarly spanning about the width of the solar module array 110, and extending along the length of the solar module array 110 according to the effective range of the pressurized air. However, in other implementations, it is contemplated that debris removal wing 200 may span less than the width of the solar module array 110, resulting in a smaller working portion corresponding to a fraction of the width of the solar module array 110. In some implementations, the debris removal wing 200 may span more than the width of the solar module array 110 to maintain full coverage of the width of the solar module array 110 where there are lateral movements of the debris removal wing 200. In some implementations, the working portion is wider than the width of debris removal wing 200, such as where the pressurized air from debris removal wing 200 spreads at least partly laterally across the width of the solar module array 110 after leaving the debris removal wing 200, or where the debris removal wing 200 is structured to direct the pressurized air at least partly laterally from the debris removal wing 200 to direct the pressurized air at least partly laterally across the width of solar module array 110.

In the present disclosure, the term pressurized air is to be understood to refer to air having sufficient pressure, volumetric flow, and velocity, capable of displacing debris from a solar module 112. In the case where the debris includes snow, in some implementations, the debris removal wing 200 may receive pressurized air at a rate of about 1500 to about 2500 actual cubic feet per minute (ACFM), at a pressure of about 1.0 to about 1.7 PSI (gauge). In some implementations, such pressures and flow rates may be achieved by a blower or similar powered by a motor having about 20 to about 30 horsepower. The pressurized air being directed toward debris can therefore be at about 1.0 PSI (gauge) as it leaves debris removal wing 200. In other implementations where higher volume and higher pressure air is to be applied, the debris removal wing 200 may receive pressurized air at a rate of about 4000 CFM or more at a pressure of about 3.0 PSI (gauge) or more using a blower or similar powered by a motor having about 60 to about 70 or more horsepower. Moreover, in some implementations, the pressurized air leaving the debris removal wing 200 is maintained in laminar or substantially laminar flow. In some implementations, the volume and pressure of pressurized air received by debris removal wing 200 may be adjustable by an operator of vehicle 60, for example by configuring power output of blower 172.

Figure 8:
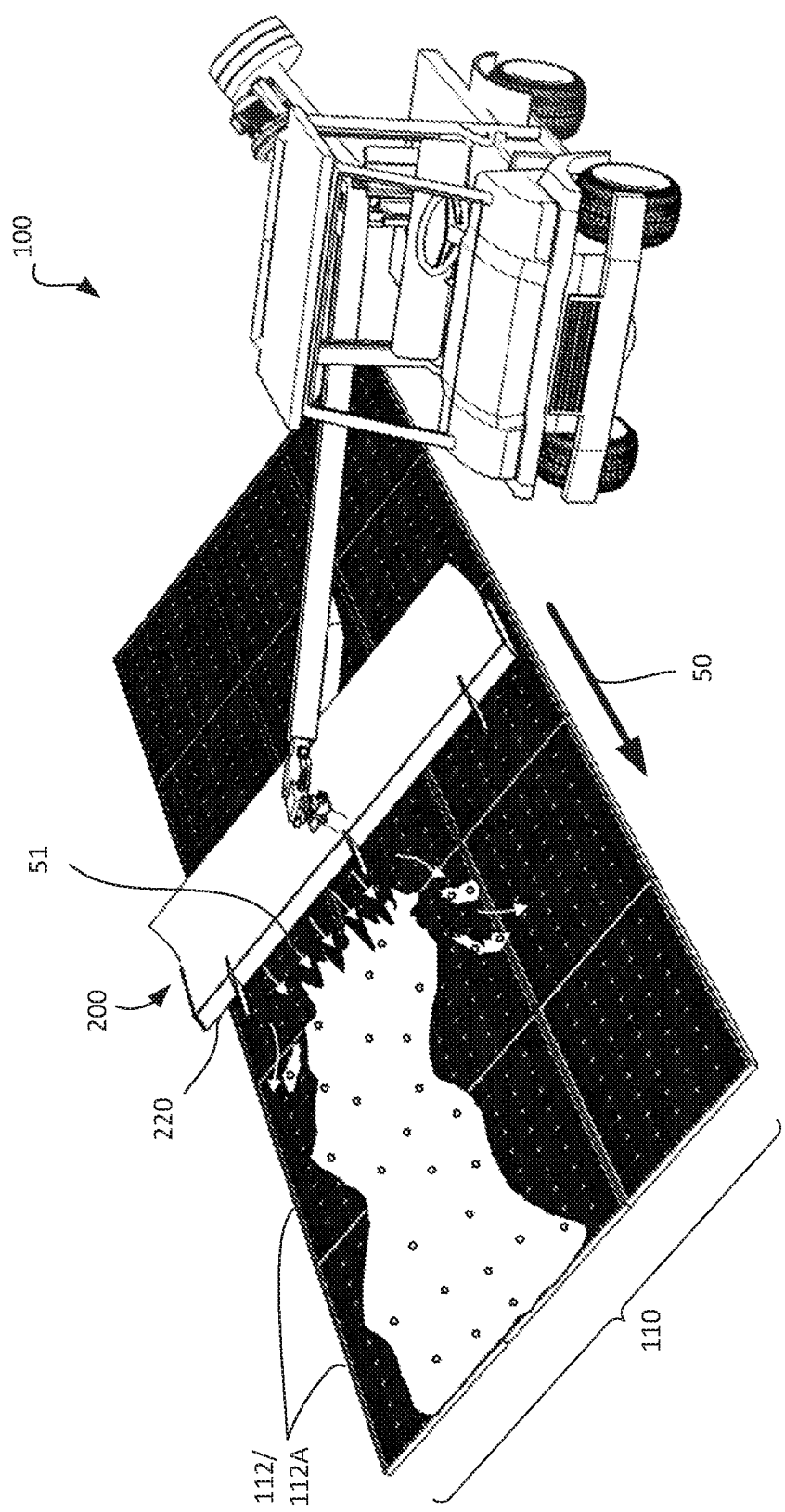
FIG. 8 is another perspective view of the system of FIG. 1 in operation removing snow from solar modules in a solar module array.

The debris removal wing 200 is maintained in proximity to operating surfaces 112A at least in part by support arm 150, and by additional features discussed in greater detail below. The debris removal wing 200 is provided pressurized air from air supply 170. A portion of the pressurized air is directed from debris removal wing 200 in a blowing direction 51 (FIG. 8, 17). In some implementations, the blowing direction 51 includes a first vector component parallel with the operating surfaces 112A, and a second vector component perpendicular to operating surfaces 112A. Thus, in some implementations, the blowing direction 51 may be partly along the operating surfaces 112A and partly toward the operating surfaces 112A, thus striking operating surfaces 112A at an angle, as discussed in greater detail with respect to FIG. 17 below. In some implementations, the blowing direction 51 may have a first vector component in a direction other than parallel to operating surfaces 112A, and a second vector component in a direction other than perpendicular to operating surfaces 112A, where the blowing direction 51 is in any direction suitable for clearing debris from operating surfaces 112A. In some implementations, the blowing direction 51 may have no first vector component parallel to operating surfaces 112A, in which case the blowing direction 51 may be directly toward operating surfaces 112A or in another direction.

The support arm 150 is configured to be fixed to a vehicle 60 by support base 160, and configured to support debris removal wing 200 over solar module array 110, and thereby push or pull the debris removal wing 200 to be advanced along the solar module array 110 in the leading direction 50 by advancement of vehicle 60 in the leading direction 50. In some implementations, the first vector component of the blowing direction 51 is about parallel with leading direction 50. In some implementations, the second vector component of the blowing direction 51 is about perpendicular to leading direction 50.

The vehicle 60 may include a utility vehicle, such as in the case of snow removal, for example, the Kubota™ RTV X1100C, a Toolcat™ 5600, or another vehicle suitable to operate in winter weather and terrain conditions. While in operation, vehicle 60 can be capable of traversing rough terrain, as is sometimes present at solar power plants.

FIG. 2 is a perspective view of system 100 from the rear of leading direction 50, showing the debris removal wing 200, air supply 170, support arm 150, and support base 160, according to a non-limiting implementation.

Support arm 150 supports the debris removal wing 200 over solar module array 110. In the present implementation, the support arm 150 includes a beam of structural metal such as aluminum, fiberglass, or steel, of sufficient length such that a vehicle 60 may support the debris removal wing 200 with a space between the solar module array 110 and the vehicle 60. A variety of supports are contemplated, which can have any suitable dimensions and comprise any structure and/or materials. In the present implementation, the support arm 150 includes hydraulic and/or electric connections for supplying hydraulic and/or electric power to actuators at the end of the support arm 150 disposed, and/or configured to be, distal from vehicle 60, discussed in greater detail below.

In some implementations, the support arm 150 may be telescopic along its length to allow it to extend to various distances to position the debris removal wing 200 over solar module arrays 110.

Support arm 150 includes a control arm 152 at the distal end thereof, which provides adjustment, control, and articulation of debris removal wing 200, as discussed below with reference to FIG. 6A.

The debris removal wing 200 may be partly disassembled by removal of support arm 150 from support base 160, and debris removal wing 200 from support arm 150, thereby allowing for efficient transport. Further, the support arm 150 may include at least one pivot or hinge (not shown) along support arm 150, allowing support arm 150 to be folded, bringing debris removal wing 200 generally adjacent to, or in front of, vehicle 60 for storage with vehicle 60 or for transport with vehicle 60.

Support base 160 includes a fulcrum 162 to which support arm 150 is fixed. The fulcrum 162 is mounted to rotatable base 164, which is mounted on mounting base 168. The rotatable base 164 is rotatable about the vertical axis of vehicle 60, which refers to the axis perpendicular to the plane defined by the wheels of the vehicle 60. Rotatable base 164 provides rotation, about the vertical axis of vehicle 60, to the fulcrum 162, and may thereby swing the support arm 150 and debris removal wing 200 around vehicle 60 to position debris removal wing 200 at either side of vehicle 60. A counterweight 166 can be connected to support arm 150, the connection being supported by fulcrum 162, thus providing counterweighting force to support arm 150. In some implementations, counterweighting force may be applied to support arm 150 via a hydraulic accumulator system.

In the present implementation, the rotatable base 164 includes a Lazy Suzan bearing and a king pin. The Lazy Suzan bearing and king pin allow the support base 160, and subsequently the support arm 150, to rotate, allowing for positioning of the debris removal wing, including positioning of the debris removal wing 200 on either side of the vehicle 60. In other implementations, the rotatable base 164 may include a turntable having wheel casters for support. Rotation of rotatable base 164 may be controlled by a rotary or linear actuator attached between the rotatable base 164 and the mounting base 168. A variety of rotating mechanisms are contemplated. In some implementations, support base 160 may include a rotary motor or a slew ring powered by a rotary motor.

Support base 160 may further include a rotary or linear actuator for vertically lifting and lowering the support arm 150 about fulcrum 162. Support arm 150 may be attached to the fulcrum 162 by a pillow block, or other housed bearing unit, which, allows the support arm 150 to pivot freely in an up-down orientation. Thus, in operation of system 100, the debris removal wing 200 may remain proximate operating surfaces 112A of solar modules 112 despite disturbances to the motion of vehicle 60. Although a linear actuator and pillow block are described, a variety of mechanical implementations providing for vertical support and control of debris removal wing 200 are contemplated. It is contemplated that the function of lifting and rotating support arm 150 can be achieved in a variety of ways, including where the mounting base 168 provides lift, or where fulcrum 162 provides rotation independent of rotatable base 164, and other variations.

The air supply 170 includes a blower 172 and supply hose 174. The blower 172 generates pressurized air to be fed by supply hose 174 for receipt and use by the debris removal wing 200. The supply hose 174 may be coupled with the support arm 150 at various points along the length of the support arm 150. In some implementations, where support arm 150 includes sufficient breadth, supply hose 174 may at least in part be disposed within the interior of support arm 150. A variety of blowers and supply lines are contemplated.

The blower 172 may include a high pressure centrifugal blower or regenerative blower, or similar, powered by a diesel, gas, or electric motor, or a blower powered by a hydraulic motor driven by the hydraulic system of vehicle 60. In some implementations, the blower 172 may have a mean operating rotations per minute (RPM) of about 3600.

In some implementations, blower 172 may be mounted on the rotatable base 164.

However, in other implementations, blower 172 may be mounted onto mounting base 168, elsewhere on support base 160, or elsewhere on vehicle 60.

In some implementations (not shown), the support arm 150 may be kinked along its length to impart to it more favorable structural strength. Kinking may provide clearance between support arm 150 and the vehicle 60 or between support arm 150 and supply hose 174.

FIGS. 3 and 4 show perspective views of the debris removal wing 200, according to a non-limiting implementation. The debris removal wing 200 includes a body 202, which may include a framed structure of lightweight structural material.

Body 202 includes a top panel 204 and bottom panel 206 (FIG. 5), and side panels forming the body 202. Top panel 204 and bottom panel 206 can be formed from materials including, but not limited to, fiberglass or carbon fiber composite, ultra-high-molecular-weight polyethylene (UHMW) or high-density polyethylene (HDPE), for their low surface-friction with snow. However, other lightweight structural materials having low surface-friction are contemplated, including sheet metal, aluminum or treated wood sheets, or a combination of such. In some implementations, side panels and bottom panel 206 may be covered in soft padding material (not shown) or non-abrasive brushes (not shown) for protecting solar modules 112 from bumping with debris removal wing 200 in the event debris removal wing 200 is not properly aligned with the solar module array 110.

In some implementations, body 202 may be formed from a multi-part mold, including a fiberglass mold or other composite material mold.

Debris removal wing 200 includes a mount 210 fixed to top panel 204, the mount 210 having a mounting plate 212 welded or otherwise fastened thereto for making a connection with support arm 150. Mount 210 may be formed with aluminum, but other lightweight, strong and smooth materials are contemplated.

Body 202 of debris removal wing 200 includes a leading end portion 242, which is tapered to decline in the leading direction 50. The leading end portion 242 may be formed of aluminum or sheet metal, but other lightweight structural materials having low surface friction, such as those described above with respect to top and bottom panels 204, 206, are contemplated. The taper is so oriented as to pare debris in the form of frozen precipitation such as snow while the debris removal wing 200 is advanced in the leading direction 50.

In some implementations, the debris removal wing 200 may include a plurality of tensioned wires 262 suspended past the leading end portion 242 of the debris removal wing 200 in the leading direction 50. The tensioned wires 262 may extend from leading end portion 242 and may be suspended between extending members 260, and fixed thereto by ties, knots, hooks, screws, or other fasteners. The tensioned wires 262 may provide further disruption of debris on solar modules 112. In the case where the debris includes snow, tensioned wires 262 may separate the snow into smaller pieces which are more easily displaced by pressurized air. Tensioned wires 262 may include metal wire, cord, chain, string, or other flexible material. It is contemplated that in other implementations, a variety of implements for mechanically breaking or disrupting debris on solar modules 112 can be used, including non-abrasive brushes, squeegees, tilling wheels, or other suitable implements.

Figure 12:
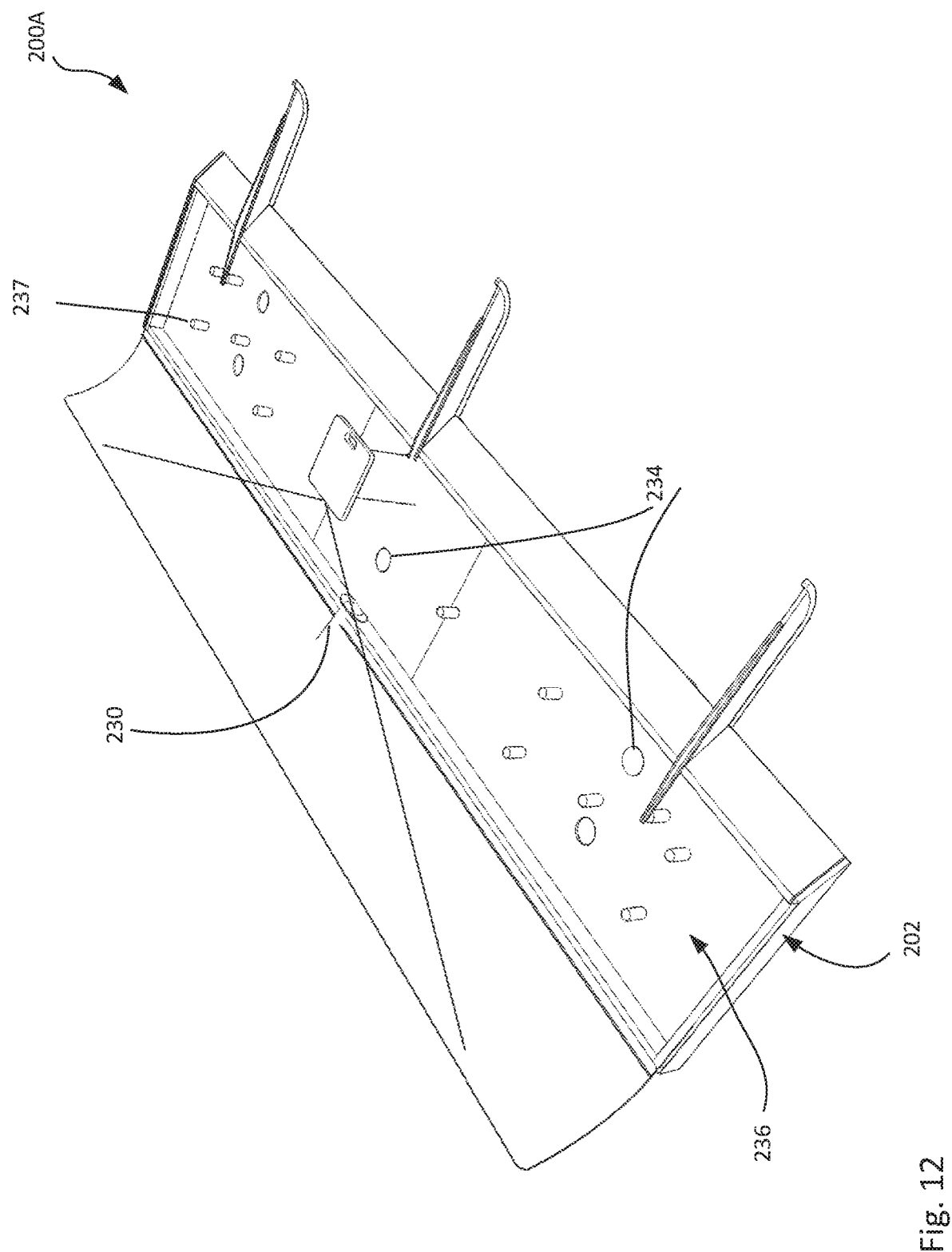
FIG. 12 is a perspective view of the debris removal wing of FIG. 11, indicating an air plenum disposed inside the body of the debris removal wing.

The debris removal wing 200 includes a frontal air outlet 220 which in operation is configured to direct a portion of the pressurized air out the leading end portion 242 of the debris removal wing 200 in blowing direction 51 (FIG. 8, 17) to remove debris from solar modules 112. In the present implementation, leading end portion 242 includes a top leading panel 242-1 and bottom leading panel 242-2, which taper toward a frontal extremity 242-3. The frontal air outlets 220 are situated along the frontal extremity 242-3, spanning all, substantially all, or a portion of the width of debris removal wing 200. The frontal air outlets 220 include a plurality of apertures or slots (not shown) situated along the frontal extremity 242-3. The top leading panel 242-1 and bottom leading panel 242-2 may be joined by fasteners (not shown), such as screws, which may be adjusted to increase or decrease the size of the apertures of frontal air outlets 220. The pressurized air is provided from air supply 170 to frontal air outlets 220 and lower air outlets 234 (FIG. 12). The apertures of frontal air outlets 220 are sized so the velocity of air expelled is effective for lifting the debris, such as snow, from the solar modules 112. In some implementations, the distance between top leading panel 242-1 and bottom leading panel 242-2 forming the apertures of frontal air outlets 220 may be about 0.05 to about 0.07 inches, and may be adjustable by fasteners spaced about every 3 to 6 inches along the frontal extremity 242-3. At such aperture sizes, and having pressurized air being received by the debris removal wing 200 at about 1500 to about 2500 ACFM at a pressure of about 1.0 to 1.7 PSI (gauge), and having about 85 to about 93 percent of pressurized air received by debris removal wing 200 directed through frontal air outlets 220, the speed of the pressurized air leaving frontal air outlets 220 may be at about 20,000 to 30,000 ft/min, suitable for displacing most kinds of snow debris. It is to be emphasized, however, that a variety of aperture sizes, volumes, and velocities of pressurized air are contemplated depending on the debris being removed.

The debris removal wing 200 includes extending members 260 extending from the leading end portion 242 of the body 202 in the leading direction 50. The extending members 260 are made of sufficient length such that gaps 52 in a solar module array 110 may be traversed by debris removal wing 200 as it is advanced in the leading direction 50, as described in greater detail with reference to FIG. 9.

In some implementations, extending members 260 include a support appendage 266 extending from top panel 204 for supporting extending member 260. Extending members 260 are joined to the leading end portion 242 of body 202 of debris removal wing 200 by bottom panel 206. Extending members 260 can be formed of fiberglass, aluminum, spring steel, HDPE, UHMW, wood, a combination thereof, or any other suitable lightweight structural material. Bottom surfaces of extending members 260 are covered in non-abrasive brushes suitable for contacting surfaces of solar modules 112 without damaging operating surfaces 112A thereof, or in some implementations non-abrasive felts or other tear- and abrasion-resistant materials suitable for contact with an operating surface 112A of a solar module 112 without damaging the surface. In some implementations, an extending member 260 may include non-abrasive brushes stapled to a lower flexible portion thereof, the lower flexible portion comprising a flexible material such as UHMW or HDPE providing elasticity to the extending member 260, and a substantially rigid upper portion, the lower flexible portion being fastened to the substantially rigid upper portion, the substantially rigid upper portion comprising a substantially rigid material such as aluminum, fiberglass, or spring steel, to provide substantial rigidity to the extending member 260. Extending members 260 may be designed to be sufficiently elastic to brace any impact on solar modules 112 caused by a debris removal wing 200 traversing gaps 52 without damaging solar modules 112, thereby providing smoother traversal of the debris removal wing 200 over gaps 52 in a solar module array 110. Extending members 260 further include distal ends 264 curved upward away from the major plane of bottom panel 206 to further facilitate bracing of any impact on solar modules 112 caused by debris removal wing 200 traversing across gaps 52.

Debris removal wing 200 further includes an adjustable flap 250 adjustable between a blocking position (FIG. 4) and a retracted position (FIG. 3). The flap 250 is joined to body 202 at pivot 208, which provides a pivot point between blocking position and retracted position. The flap 250 may be joined at pivot 208 by fasteners, such as, for example, hook-and-loop fasteners (e.g. Velcro®), but other fasteners like buttons, screws and tape, or a combination thereof, are contemplated. In some implementations pivot 208 may include a hinge, a lock and pin mechanism, or other suitable pivoting adjustment mechanism.

The flap 250 is formed of a low surface-friction material. In some implementations, the flap 250 includes a rigid flap comprising lightweight material such as fiberglass or carbon fiber composite, aluminum, or similar, providing rigidity to the flap 250. In other implementations, the flap 250 includes a loose flap of lightweight sheet material such as NorthSails 3Di™ flexible composite material, Dacron™ polyester fiber, polyurethane tarp, EDPM or other flexible, light weight, low-stretch, low surface-friction, and waterproof material, and having an elongated supporting member integrated into its front edge and having support cord or wire lanyards fastening the supporting member of the loose flap to the debris removal wing 200 to support the loose flap in blocking position or retracted position. In some implementations, the elongated supporting member can comprise a rigid tube. In other implementations, the flap 250 comprises a combination of a rigid flap and a loose flap fastened to the rigid flap. In some implementations, the flap 250 includes a loose sheet material fastened to a rigid material to provide sufficient tension and freedom of motion to the loose sheet material to deter adherence of snow to the loose flap.

When in its retracted position, the flap 250 may form a curvature concave away from the debris removal wing 200. This curvature aids in removal of debris from the debris removal wing 200 by the force of gravity where the opened orientation of the flap 250 will direct the debris that has been lifted up at the tapered leading end portion 242 to gather and fall from the flap 250.

When in its blocking position, flap 250 is engaged in a generally outward- and downward-facing orientation, which blocks and limits blowback from debris being removed from solar modules 112 which may have an upward trajectory after contact with pressurized air. Such blowback is particularly prevalent where the debris includes light snow, dust, or sand, and the like. Where flap 250 comprises a rigid flap, flap 250 may be engaged between its blocking position and retracted position by a rotary actuator disposed within debris removal wing 200, providing rotation to pivot 208. A variety of actuation mechanism are contemplated.

FIG. 5 shows the debris removal wing 200 as viewed from its lower side 203 according to a non-limiting implementation. The side 203 includes bottom panel 206 and lower air outlets 234 (FIG. 12) which in operation are configured to direct a portion of the pressurized air out the side 203 to at least partly hover the debris removal wing 200 over solar modules 112. Lower air outlets 234 may include valves configurable to regulate the flow of pressurized air therethrough.

In the present implementation shown, lower air outlets 234 provide pressurized air through air casters 232, disposed across the side 203. Air casters 232 are pneumatic devices having a flexible inflatable diaphragm 232-1 including air holes 232-2 allowing pressurized air to travel therethrough.

The diaphragms 232-1 of air casters 232 are inflated by pressurized air provided through lower air outlets 234. When inflated, air holes 232-2 expel pressurized air from the lower air outlets 234 away from side 203 in a downward direction toward solar modules 112 to create a thin film or cushion of pressurized air between debris removal wing 200 and solar modules 112. This film or cushion maintains the debris removal wing 200 proximate operating surfaces 112A of solar modules 112 at a distance, minimizing and/or avoiding contact between the debris removal wing 200 and the solar modules 112. The film or cushion further facilitates low-friction movement of the debris removal wing 200 over the solar modules 112.

The air casters 232 can be disposed on the side 203 in a variety of arrangements. In FIG. 5, the air casters 232 are disposed in opposing sets nearly in line with extending members 260. The air casters 232 may be arranged symmetrically in the length and width directions. The number and positioning of air casters 232 may vary depending on the size and shape of debris removal wing 200. The debris removal wing 200 may be sized differently to accommodate varying widths, lengths, and quantities of solar modules 112 in a solar module array 110.

In some implementations, the air casters 232 are disposed evenly spaced along the width of debris removal wing 200, as shown in FIG. 5, with sufficient lateral gaps between neighboring air casters 232 to provide clearance for protrusions such as clamps or other protrusions from solar modules 112 to avoid such protrusions contacting and possibly damaging air casters 232.

The air casters 232 may be formed from coated ballistic nylon such as Cordura® fabric or similar. Other flexible, lightweight, low-stretch, and tear- and abrasion-resistant materials are also contemplated, such as urethane.

Debris removal wing 200 includes air inlet 230, providing a connection with supply hose 174 for providing pressurized air to frontal air outlets 220 and lower air outlets 234.

The frontal air outlets 220 and lower air outlet 234 are configured to divide the pressurized air in a manner providing sufficient hover of the debris removal wing 200 over solar modules 112 and sufficient displacement of debris from solar modules 112. Portions of pressurized air may be divided between frontal air outlets 220 and lower air outlet 234 in a variety of ways, including fixing the relative sizes of outlets 220, 234. In some implementations, relative sizes of outlets 220 may be adjustable by adjusting fasteners between top leading panel 242-1 and bottom leading panel 242-2 to adjust the opening there between and/or adjusting valves situated in lower air outlets 234. In some implementations, the frontal air outlets 220 and lower air outlets 234 may be in communication with air inlet 230 via valves configurable to regulate the flow of pressurized air thereto.

In some implementations, a first portion of pressurized air directed through frontal air outlets 220 include about 85 to about 93 percent by volume of the total pressurized air flow, the balance being directed through lower air outlets 234. In some implementations, about 88 to about 93 percent by volume is directed through frontal air outlets 220. In some implementations, about 90 to about 93 percent by volume is directed through frontal air outlets 220. In some implementations, about 90 to about 92 percent by volume is directed through frontal air outlets 220. In each case, the balance being directed through lower air outlet 234.

Figure 6A:
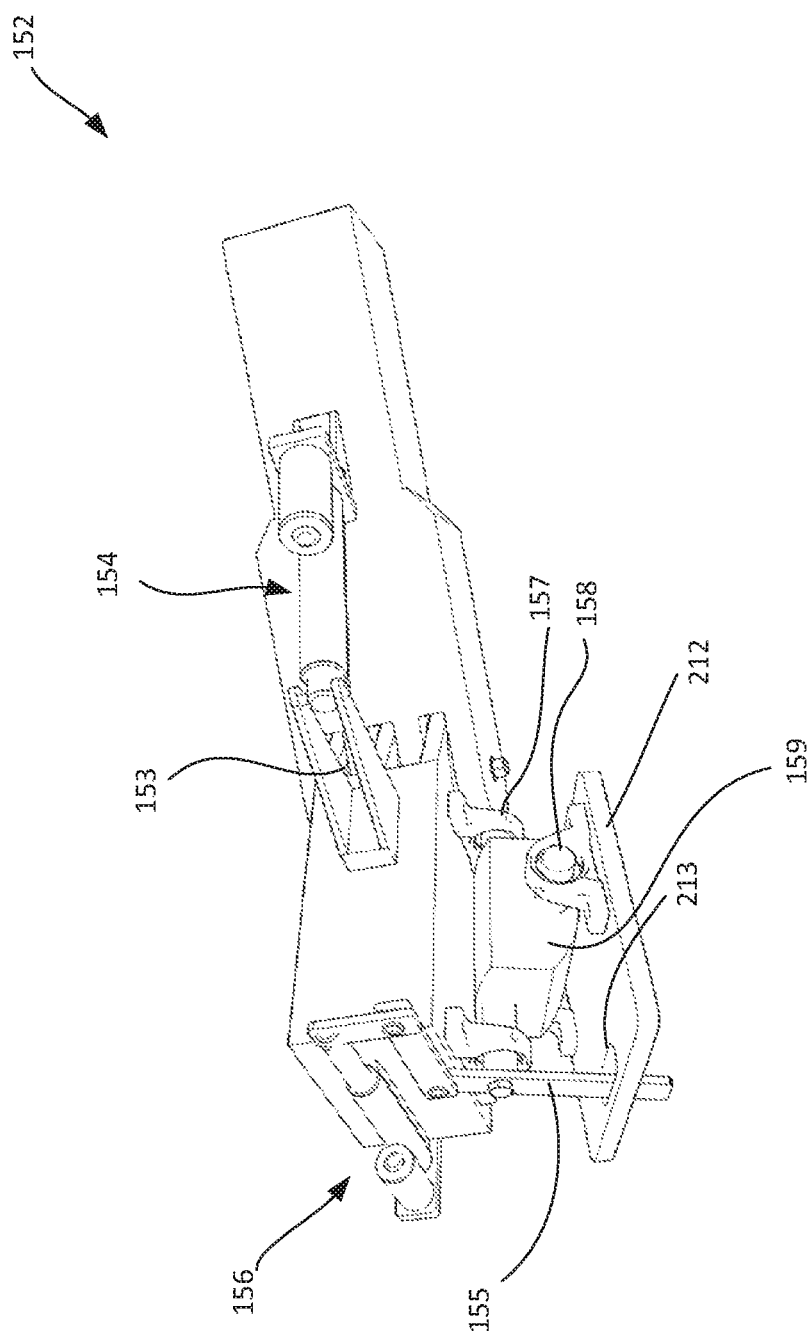
FIG. 6A is a perspective view of a control arm of the support arm of the system of FIG. 1.

FIG. 6A is a perspective view of the control arm 152 of the support arm 150, according to a non-limiting implementation. The control arm 152 includes two control points, powered by hydraulic actuators, providing yaw and roll motions for aligning the debris removal wing 200 with solar modules 112 of the solar module array 110, indicated as yaw actuator 154 and roll actuator 156.

The control arm 152 includes a finger joint 153 that permits the yaw movement to be controlled by yaw actuator 154.

Roll actuator 156 is attached near the front of the control arm 152 to rotate a rod 155, indicated as protruding through a slot 213 on mounting plate 212. As the rod 155 rotates, it biases against portions of slot 213, causing roll of the debris removal wing 200. In operation, when the debris removal wing 200 is positioned proximate solar modules 112, the rod 155 is situated centrally within the slot 213, which allows the debris removal wing 200 to roll and pitch freely and independently of any disturbances in motion of the vehicle 60 that is transferred through the support arm 150. Freedom of movement in roll and pitch directions is achieved by sets of two pillow blocks 157, 158, or other housed bearing units, situated at right angles to one another as shown. A first pillow block 157 is attached to the control arm 152, the second pillow block 158 being connected to the mounting plate 212. Rods situated within sets of pillow blocks 157, 158, are integral with block 159, thus serving as a universal joint allowing for simultaneous rotation around the roll and pitch axes.

In some implementations, the yaw and roll motions achieved by the control arm 152, and the lift and swing motions achieved by the support base 160, can be controlled by an operator in vehicle 60 via an industrial joystick controller, push buttons, touch screen, computer, or other input device in a prescribed manner determined by programmed logic, running on a control systems platform including a processor, including a microcontroller, a state machine, application-specific integrated circuit (AISC), system-on-a-chip (SOC), Arduino™, Raspberry Pi™, Allen-Bradley™ controller, or similar, configured to execute control logic for driving the actuators, or other control components.

In some implementations, control of control arm 152 through control systems is informed by sensors, including distance and positional sensors, orientation and motion sensors including proximity sensors, accelerometers and gyroscopes or other sensors. The debris removal wing 200 may thereby include programming logic to self-adjust to the plane of the solar module array 110 or self-adjust to maintain a constant height above the solar module array 110 when suspended above them, thus minimizing operator intervention and providing a safe means of operation.

The actuators described above may include hydraulic linear actuators. However, other implementations are contemplated where other motion control devices are used, including hydraulic rotary actuators, electric linear or rotary actuators, hydraulic cylinders and manifolds, pneumatic cylinders and manifolds, gear motors, stepper motors or servo motors, chain and sprocket or gear assemblies.

In other implementations, orientation of the debris removal wing 200 about the control arm 152 is achieved by other mechanisms, including a floating actuator, swivel, or gimbal providing limited multidirectional freedom of motion of debris removal wing 200.

Figure 6B:
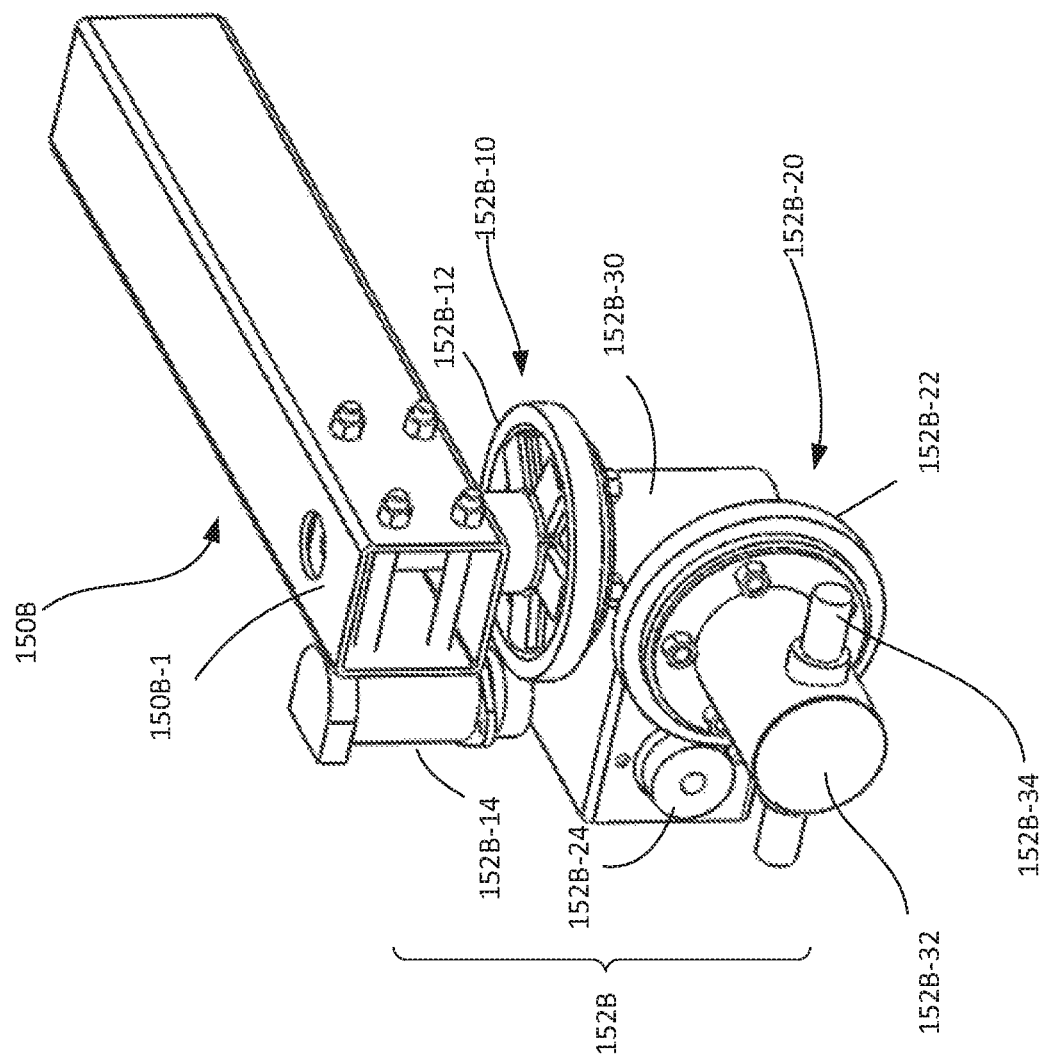
FIG. 6B is a perspective view of a gimbal control arm of a support arm.

FIG. 6B is a perspective view of a gimbal control arm 152B of a support arm 150B, according to a non-limiting implementation. Gimbal control arm 152B comprises a yaw assembly 152B-10 for providing yaw to the debris removal wing 200 and a roll assembly 152B-20 for providing roll to the debris removal wing 200. Yaw assembly 152B-10 comprises a shaft hub 152B-12 and a yaw actuator 152B-14, such as a hydraulic rotary actuator shown, for providing rotation to shaft hub 152B-12. Similarly, roll assembly 152B-20 comprises a shaft hub 152B-22 and a roll actuator 152B-24, such as a hydraulic rotary actuator shown, for providing rotation to shaft hub 152B-22. The shaft hubs 152B-12, 152B-22, may be turned through sets of spur gears (not shown).

The yaw assembly 152B-10 is attached to the distal end 150B-1 of support arm 150B. The roll assembly 152B-20 is in communication with yaw assembly 152B-10 by fixture to an extension 152B-30 extending from yaw assembly 152B-10 toward the direction of debris removal wing 200.

An extension 152B-32 extends from shaft hub 152B-22 perpendicular to extension 152B-30 extending from shaft hub 152B-12, and supports a pitch shaft 152B-34 extending through extension 152B-32. The pitch shaft 152B-34 extends through pillow blocks 158 (see FIG. 6A), or other housed bearing units, on the mounting plate 212 (see FIG. 6A) to support debris removal wing 200.

The pitch shaft 152B-34 is free-floating through pillow blocks 158, thus providing free range of motion in the pitch orientation to debris removal wing 200. The yaw actuator 152B-14 and roll actuator 152B-24 can be actuated to adjust yaw and roll, respectively, of debris removal wing 200. In operation, yaw actuator 152B-14 may hold the yaw of debris removal wing 200 fixed to prevent movement in the yaw orientation, whereas the roll actuator 152B-24 may be allowed to float to provide free motion in the roll direction to debris removal wing 200. The fixture and floatation of yaw actuator 152B-14 and roll actuator 152B-24 may be controlled by control systems as described above with reference to FIG. 6A. The gimbal control arm 152B can thereby allow debris removal wing 200 to be maintained planar with operating surfaces 112A of solar modules 112 while compensating for disturbances in operation such as bumps in the terrain being traversed by vehicle 60, changes in inclinations of solar modules 112, or other disturbances.

Figure 7:
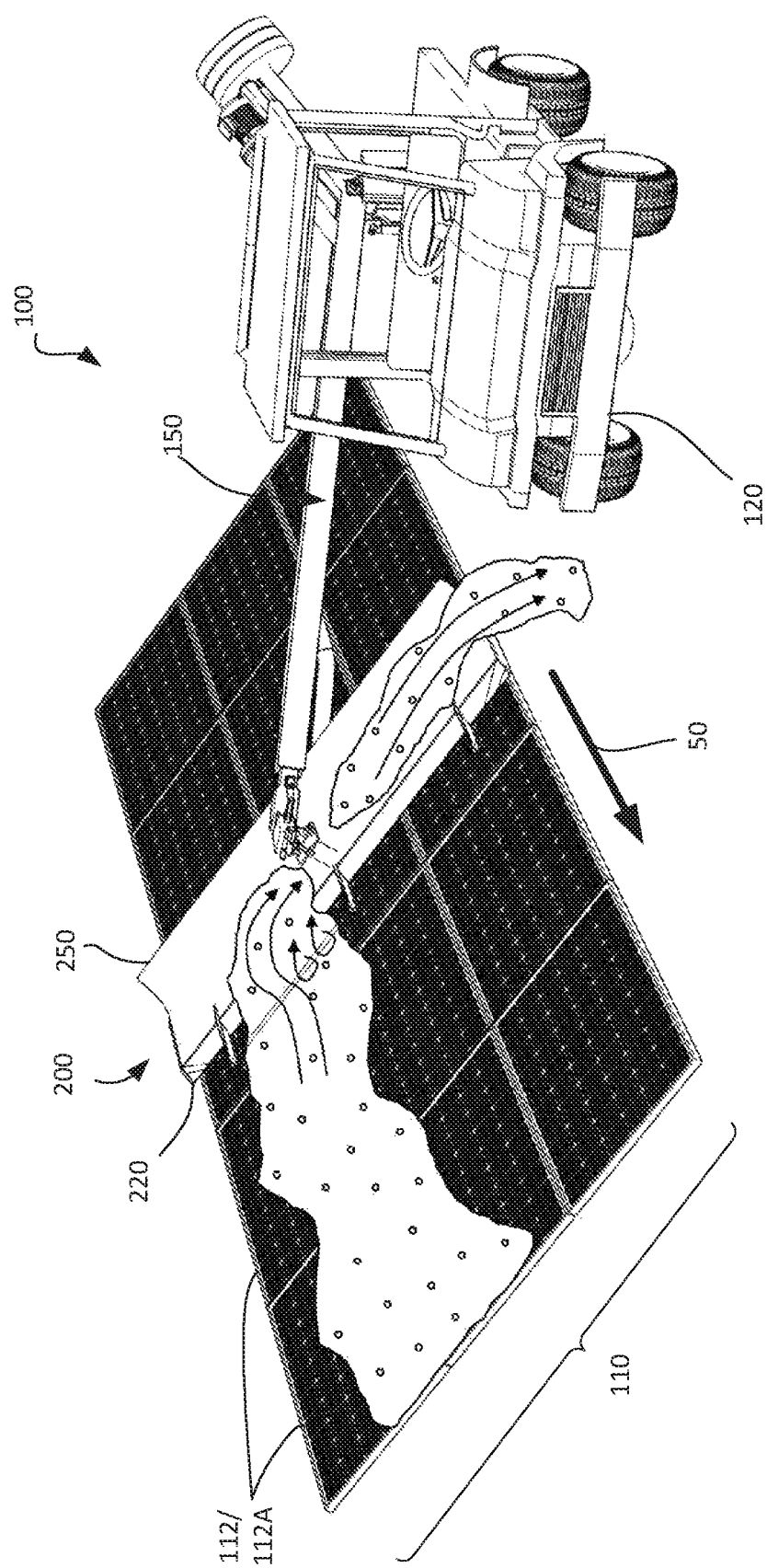
FIG. 7 is a perspective view of the system of FIG. 1 in operation removing snow from solar modules in a solar module array.

FIGS. 7 and 8 show perspective views of the system 100 in operation removing snow from solar modules 112 of a solar module array 110, according to a non-limiting implementation.

Prior to operation, the debris removal wing 200 is situated proximate to, an operating surface 112A of, a target solar module 112. The debris removal wing 200 thus has a width which spans a working portion of the solar modules 112 having snow to be removed. Positioning the debris removal wing 200 is achieved by lifting and swinging of the support arm 150 as described above, and articulation of yaw and roll by control arm 152 as described above.

During operation, the diaphragms 232-1 of air casters 232 are filled with pressurized air, and the air holes 232-2 provide a film or cushion of air between the debris removal wing 200 and operating surfaces 112A of solar modules 112. This film or cushion maintains the debris removal wing 200 proximate operating surfaces 112A of solar modules 112 at a distance, minimizing and/or avoiding contact between the debris removal wing 200 and the solar modules 112. The film or cushion further facilitates low-friction movement of the debris removal wing 200 over the solar modules 112. Bottom panel 206 may further include a low-friction surface, to further facilitate low-friction movement of the debris removal wing 200 across solar modules 112.

During operation, vehicle 60 advances in leading direction 50 along the solar module array 110, causing the debris removal wing 200 to advance in leading direction 50 along operating surfaces 112A of solar modules 112.

The frontal air outlets 220 of the debris removal wing 200 directs high volume pressurized air in the blowing direction 51 to displace or break up snow debris on the solar modules 112. As shown in FIG. 7, in the case where the snow comprises primarily high density, high moisture snow, the debris removal wing 200 plows the snow from solar modules 112. In some instances, due to the tapered profile of the leading end portion 242 and from displacement of the snow by pressurized air from frontal air outlets 220, a portion of the snow will transfer on top of the flap 250 in retracted position as shown. Given the inclination of solar modules 112, gravity then acts on the snow causing the snow to slide down the low-friction surface of flap 250 and is thereby removed from solar modules 112. As shown in FIG. 8, in the case where the snow comprises primarily low density, low moisture snow, the debris removal wing 200, the pressurized air from frontal air outlets 220 may directly displace the snow from solar modules 112.

In conditions where the depth of the snow on the solar modules 112 amounts to about 10 cm or less, snow may simply be displaced forward by the high velocity air ejected from frontal air outlets 220, without transference of the snow over the top of the debris removal wing 200. In some implementations, the frontal air outlets 220 are configured to direct pressurized air from debris removal wing 200 at an angle of about 45 degrees from bottom panel 206. Thus, pressurized air is directed to operating surfaces 112A of solar modules 112 at about 45 degrees during operation, resulting in a point of contact of about 3 cm from frontal air outlets 220 when debris removal wing 200 is maintained about 3 cm above operating surfaces 112A of solar modules 112.

Figure 9:
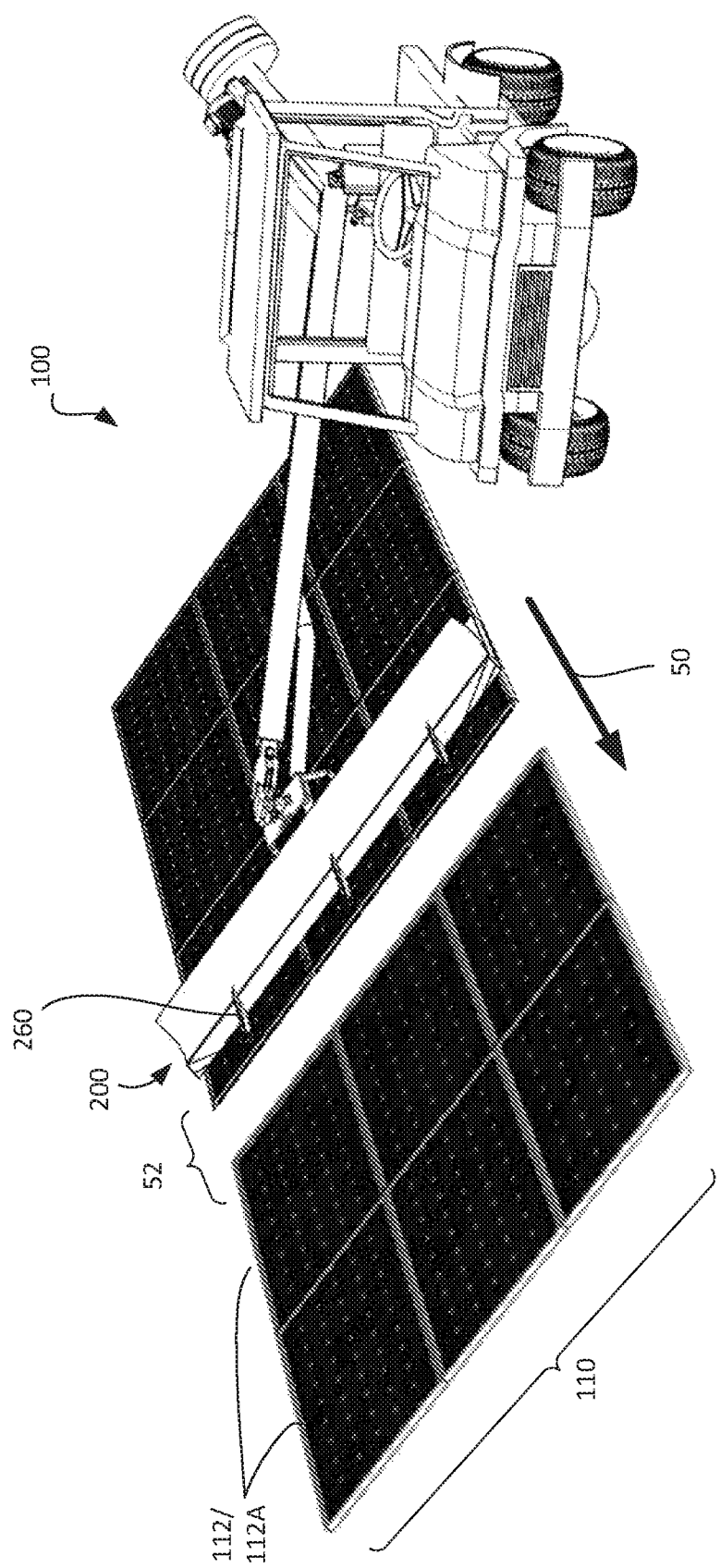
FIG. 9 is a perspective view of the system of FIG. 1, showing the debris removal wing traversing a gap in the solar module array.

FIG. 9 shows the debris removal wing 200 traversing a gap 52 in the solar module array 110, according to a non-limiting implementation. Solar modules 112, typically about 40 inches in width and about 80 inches in length, are typically arranged in adjacent tables with gaps 52 between them, ranging in distance from about 3 inches to about 12 inches. Such gaps 52 may further include a difference in height between adjacent tables. Extending members 260, described above, assist in traversing the debris removal wing 200 over such gaps 52. The non-abrasive brushes, the elasticity, and the curved distal ends 264 contribute to facilitating smooth traversal across gaps 52.

Figure 10:
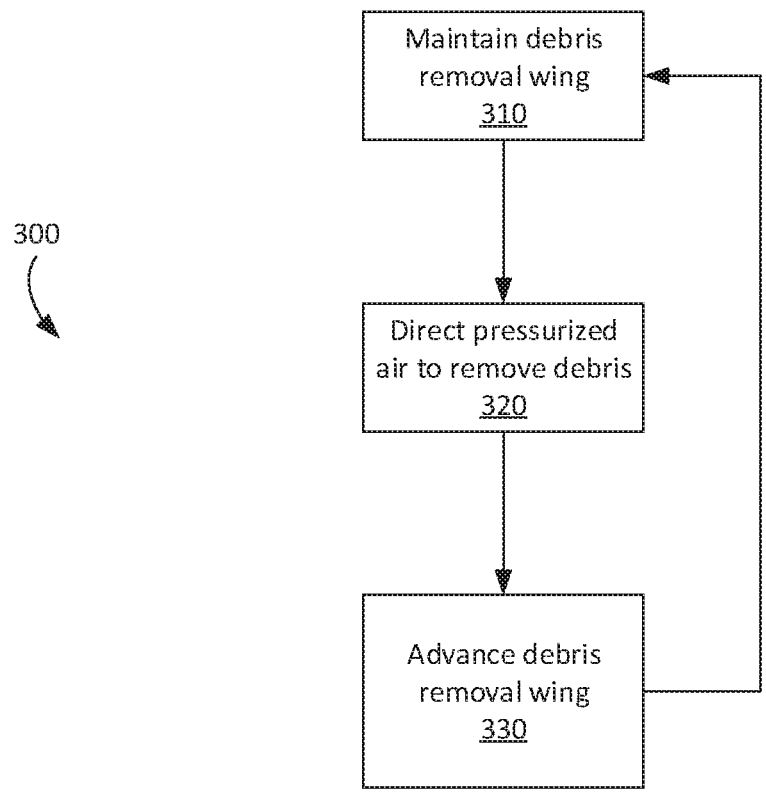
FIG. 10 is a flowchart of a method for removing debris from solar modules in a solar module array.

FIG. 10 is a flowchart of a method 300 for removing debris from solar modules 112 in a solar module array 110, according to a non-limiting implementation. The method 300 is described as performed by system 100 and debris removal wing 200 discussed herein, but this is not limiting, and the method 300 can alternatively be performed by other systems or apparatuses are variations thereto.

At block 310, the debris removal wing 200 is maintained proximate to a solar module 112 of the solar module array 110. The term proximate is to be understood as defined above. In some implementations, the debris removal wing 200 is maintained by support of the support arm 150, and any lifting by actuators thereof, and by proper rotation of support base 160 to swing of the support arm 150 into position. In some implementations, the maintaining is also achieved by control arm 152 or gimbal control arm 152B allowing for free rotation around the roll and pitch axes, the yaw being fixed. In some implementations, debris removal wing 200 can be articulated by any articulation of yaw actuator 154 or roll actuator 156. Further, in some implementations, the maintaining may be achieved by hovering caused by a film or cushion of high pressure air from lower air outlets 234 and/or air casters 232. In some implementations, the maintaining may involve active articulation of the debris removal wing 200 in at least yaw or roll directions to compensate for changes in inclination of the solar modules 112 or terrain travelled by vehicle 60.

At block 320, pressurized air is directed out of frontal air outlets 220 to displace debris on solar modules 112. As discussed above, in some instances, pressurized air from frontal air outlets 220 may directly displace the snow from solar modules 112. In other instances, a portion of the debris may transfer on top of debris removal wing 200.

At block 330, the debris removal wing 200 is advanced in the leading direction 50. In some instances, due to the tapered profile of the leading end portion 242 and from displacement of the snow by pressurized air from frontal air outlets 220, gravity may act on the debris to cause the debris to slide down debris removal wing 200 and is thereby removed from solar modules 112. Advancing the debris removal wing 200 may involve traversing a gap 52 using an extending member 260. The extending member 260 extends in the leading direction 50 by a length greater than the gap 52, thus bridging the gap 52 and supporting the debris removal wing 200 over the gap 52. Where the gap 52 includes an increase in elevation between a first solar module 112 on the first side of the gap 52 and a second solar module 112 on the second side of the gap 52, the upward curvature of distal ends 264 of extending members 260 make contact with the second neighboring solar module 112 and deflect the debris removal wing 200 upward to accommodate any change in elevation between the solar modules. The extending member 260 may be designed to be sufficiently elastic to brace any such impact of the debris removal wing 200 without damaging the second solar module 112 with which extending members 260 make contact.

The method 300 may further involve blocking blowback of debris from the solar modules 112 using flap 250 engaged in the blocking position (FIG. 4).

Figure 11:
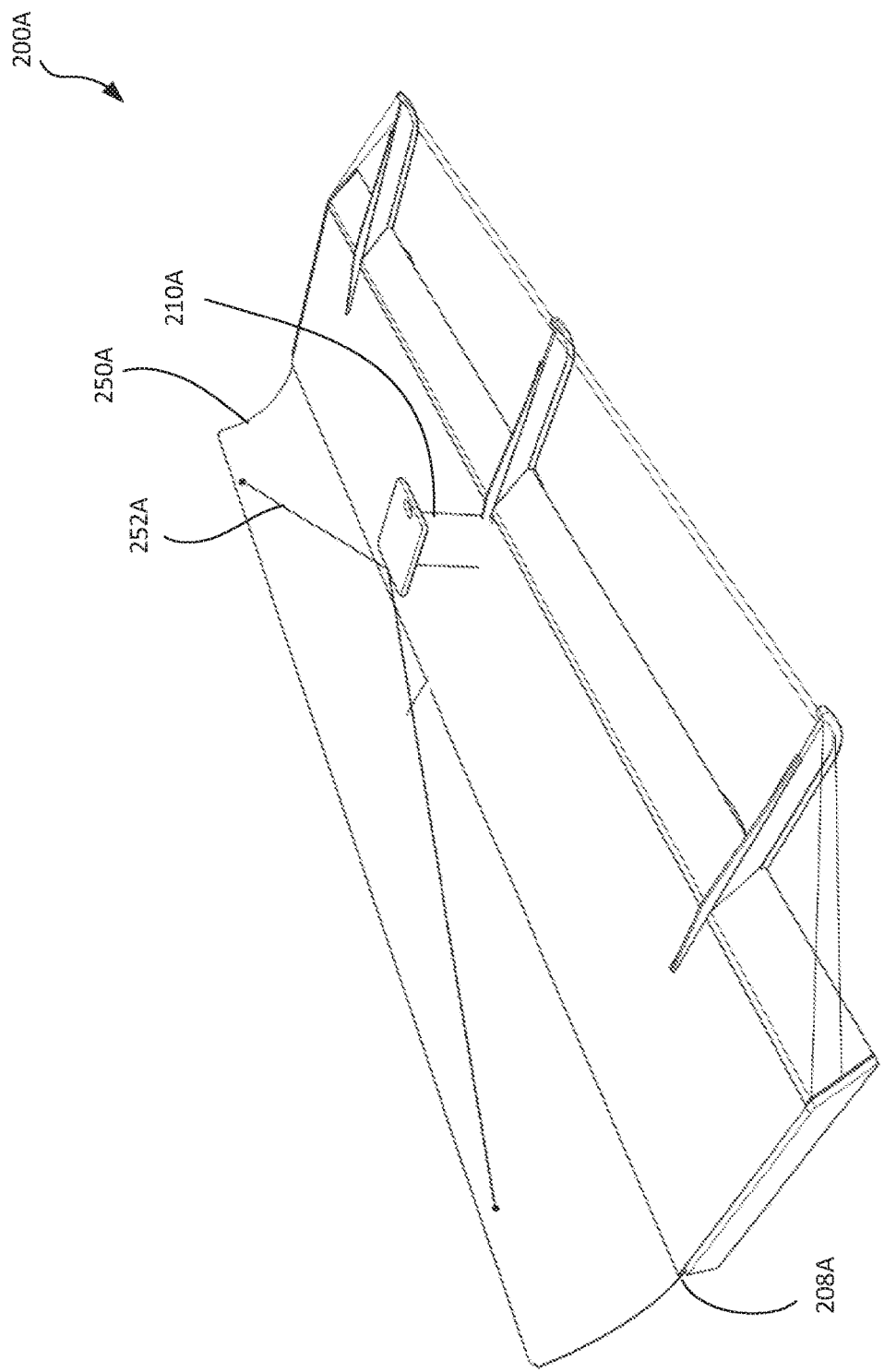
FIG. 11 is a perspective view of another implementation of the debris removal wing.

FIG. 11 is a perspective view of another implementation of the debris removal wing, indicated as debris removal wing 200A, according to a non-limiting implementation. In debris removal wing 200A, flap 250A is attached at pivot 208A, which is situated near the rear of body 202A of debris removal wing 200A.

The flap 250A is held supported by tensioned cables 252A extending from the mount 210A to about the rear of flap 250A.

The debris removal wing 200A includes a mounting column 210A for attachment to a support arm 150, the mounting column 210A being situated near leading end portion of debris removal wing 200A. Thus, it can be seen that in some implementations, the position of mount 210A for connecting with a support arm 150 may vary.

FIG. 12 is a perspective view of debris removal wing 200A, with the top panel 204 omitted to allow viewing the interior of debris removal wing 200A, according to a non-limiting implementation. Debris removal wing 200A comprises air plenum 236 disposed inside the body 202 of the debris removal wing 200A, in communication with air inlet 230, frontal air outlets 220, and lower air outlets 234. In the present implementation, the air plenum 236 includes the space inside debris removal wing 200. The air plenum 236 is thus defined between top panel 204 and bottom panel 206 and provides a space configured to store and build pressurized air before delivery to frontal air outlets 220 and lower air outlets 234. In some implementations, the pressurized air in the air plenum 236 receives a volumetric capacity of about 1500 actual cubic feet per minute (ACFM) from air inlet 230, and maintains a pressure of about 1.0 PSI.

A variety of configurations for providing pressurized air from air inlet 230 to frontal air outlets 220 and lower air outlets 234 are contemplated. In some implementations, the debris removal wing 200 may include an air plenum 236 as a separate compartment and/or component disposed inside the debris removal wing 200 having inlets and outlets in fluid communication with frontal air outlets 220 and lower air outlets 234. In some implementations, the air plenum 236 can be omitted and replaced by piping or tubing communicating pressurized air from air inlet 230 to frontal air outlets 220 and lower air outlets 234. In some implementations, the frontal air outlets 220 and lower air outlets 234 may be in communication with air inlet 230 via valves configurable to regulate the flow of pressurized air thereto.

The framed structure of body 202 may be structurally supported by supports 237, including aluminum tubes, or other structural support materials.

Figure 13:
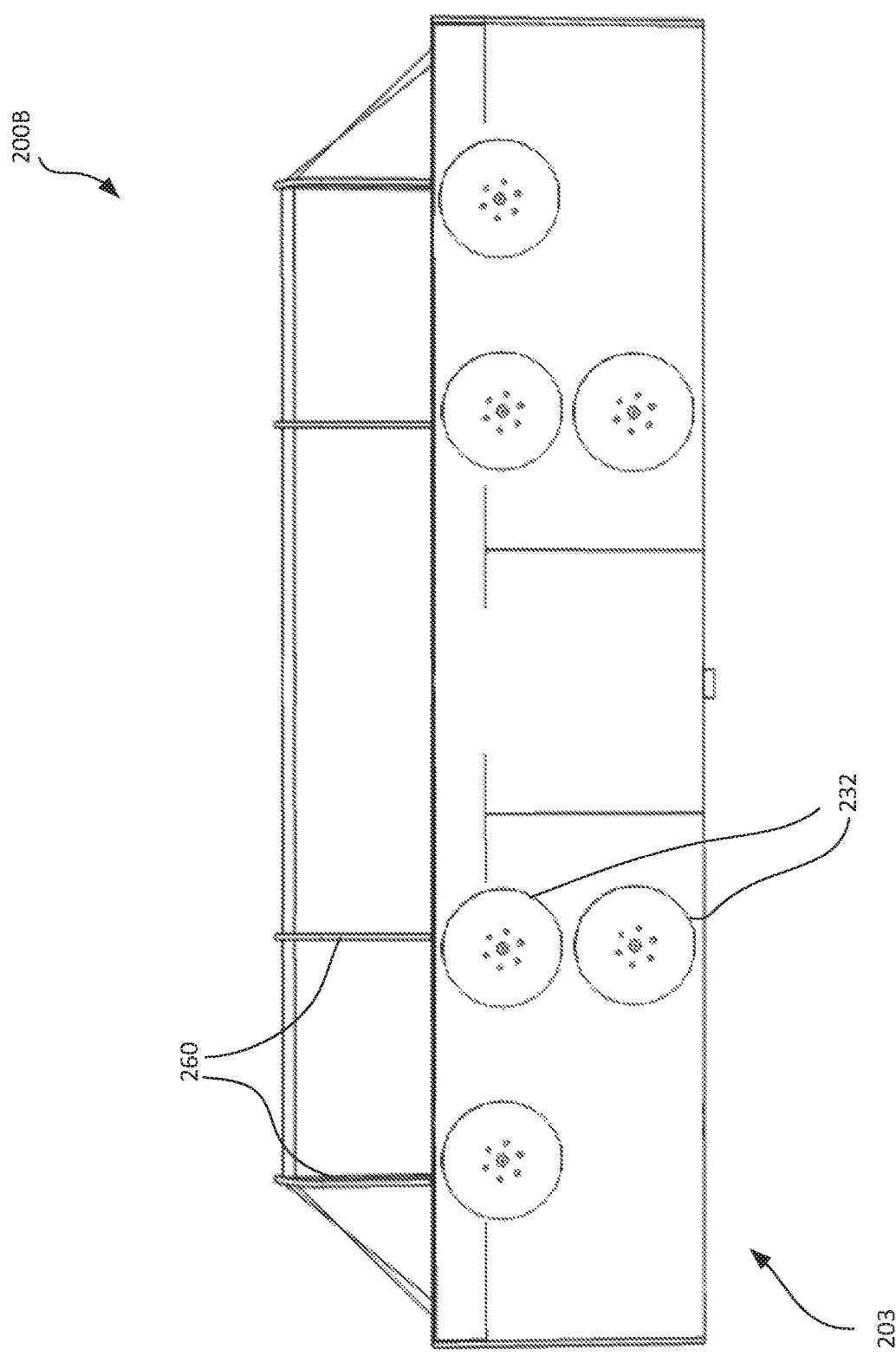
FIG. 13 is a perspective view of another implementation of the debris removal wing, showing a lower side thereof.

FIG. 13 shows debris removal wing 200B, showing a lower side 203 thereof, according to another non-limiting implementation. The debris removal wing 200B includes four extending members 260, and an arrangement of air casters 232 disposed on side 203 generally aligned with extending members 260. In some implementations, the air casters 232 may be disposed in a manner aligned with extending members 260 in a manner configured to provide a smooth transition from being supported by extending members 260 to being supported by pressurized air from air casters 232 where the debris removal wing 200 crosses a gap 52 (FIG. 9). However, in still other implementations, air casters 232 can be disposed about the side 203 in a variety of arrangements, provided that there is sufficient coverage such that the debris removal wing 200B is sufficiently balanced during operation. Thus, it can be seen that a variety of arrangements and quantity of extending members 260 and air casters 232 are contemplated. It is further contemplated that the air casters 232 may be of varying diameter, height, shape, or any other dimension.

Figure 14:
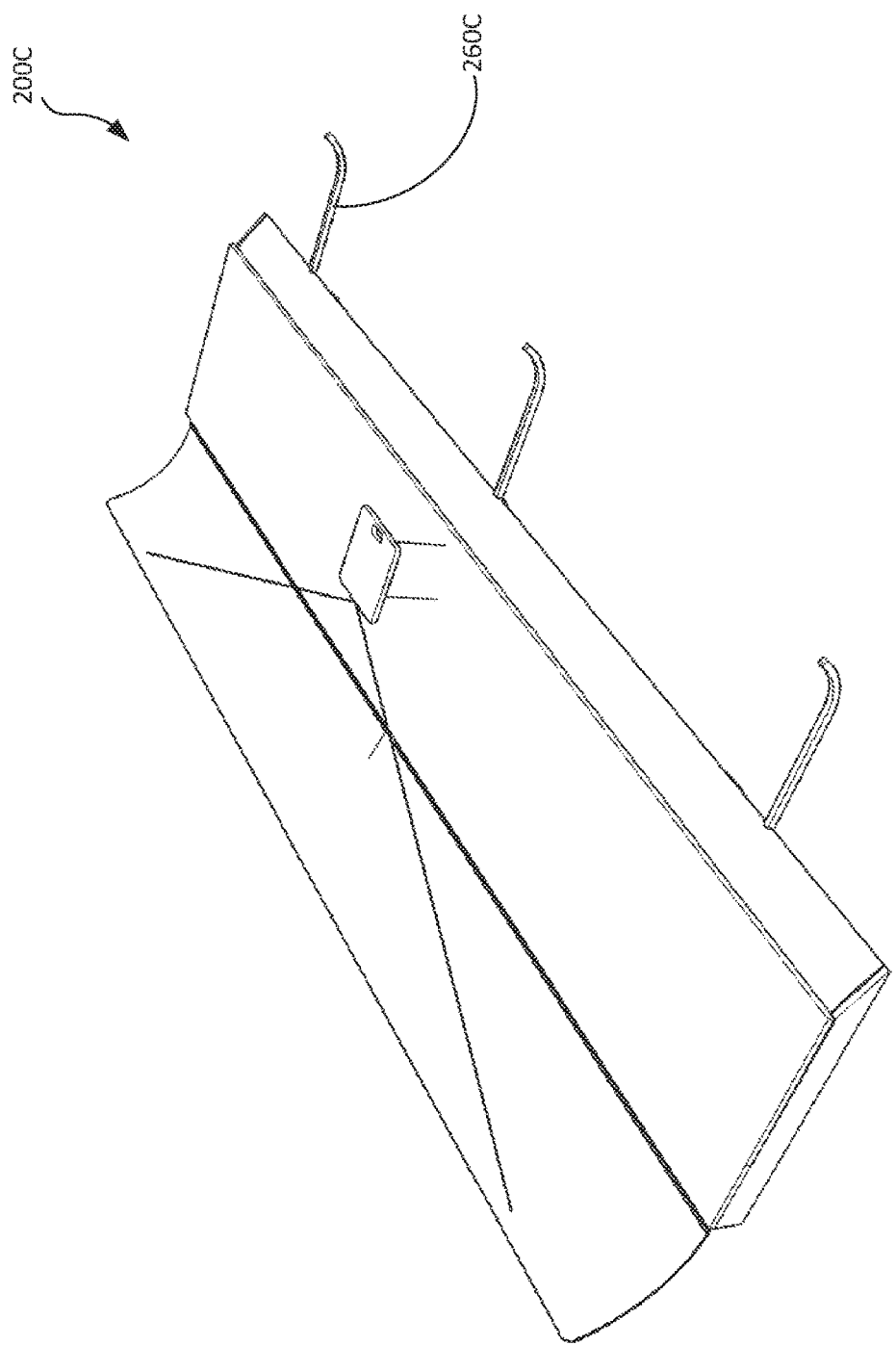
FIG. 14 is a perspective view of another implementation of the debris removal wing.

FIG. 14 is a perspective view of a debris removal wing 200C, according to another non-limiting implementation. Debris removal wing 200C includes extending members 260C joined to the leading end portion 242 of body 202 of debris removal wing 200C by bottom panel 206. The extending members 260C omit the support appendage 266 included in extending members 260 debris removal wing 200 to provide for additional clearance for debris (FIG. 3).

Figure 15:
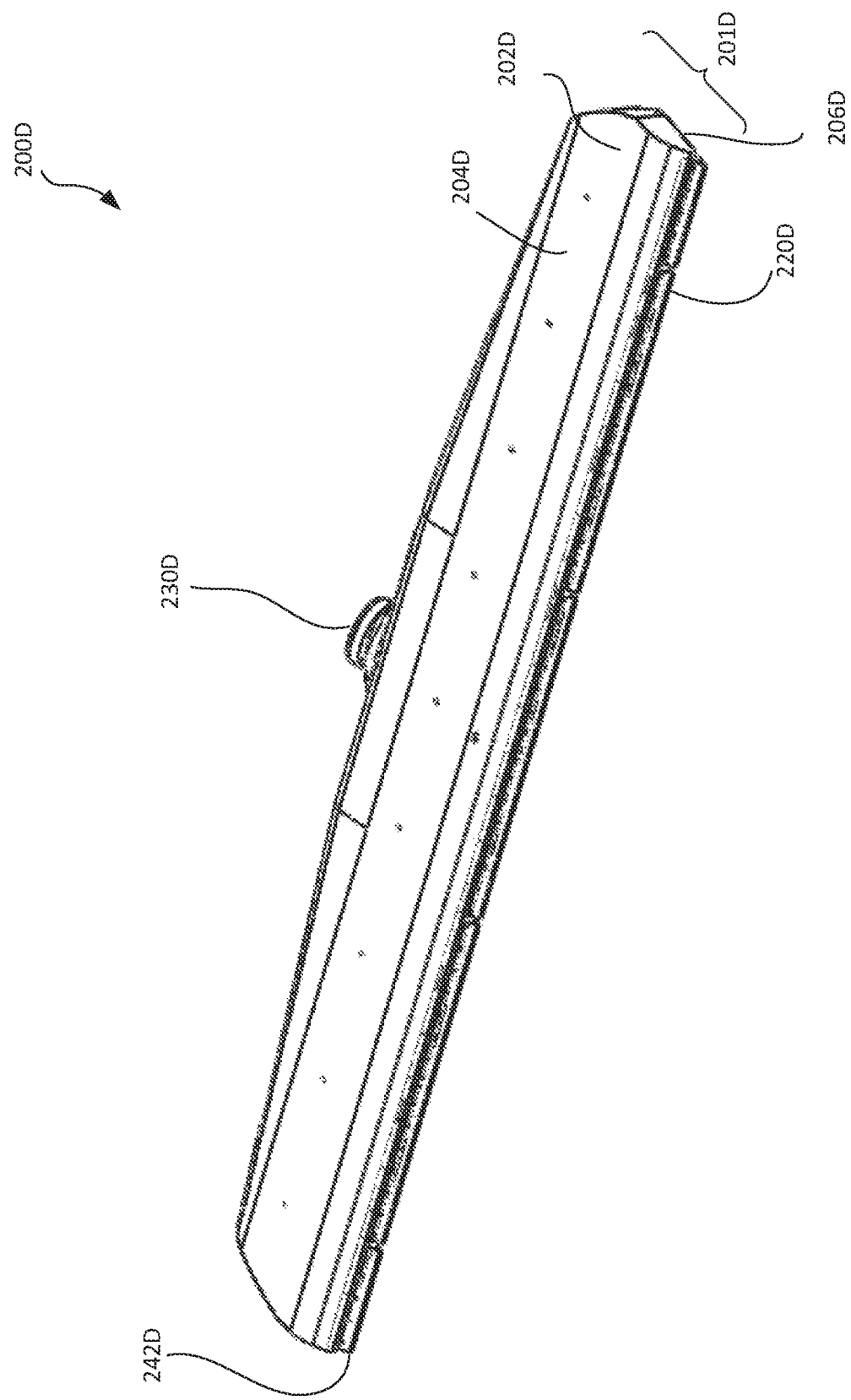
FIG. 15 is a perspective view of yet another implementation of the debris removal wing.

FIG. 15 is a perspective view of a debris removal wing 200D, according to another non-limiting implementation. The debris removal wing 200D includes an air inlet 230D. The debris removal wing 200D includes a two-part molded body 202D having top panel 204D and bottom panel 206D formed of fiberglass, which includes a tapered and sloped profile 201D in a wedge-like manner along its length, terminating at frontal air outlets 220D at the frontal extremity of the leading end portion 242D. The sloped profile 201D, leading end portion 242D, and frontal air outlets 220D are described in greater detail below.

Figure 16:
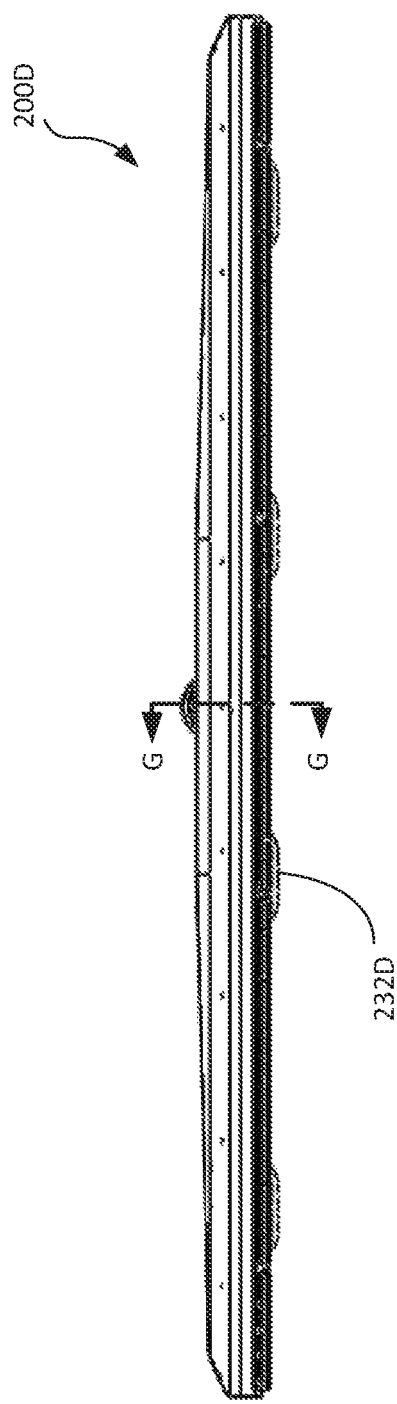
FIG. 16 is a front view of the debris removal wing of FIG. 15 indicating a line of cross-section.
Figure 17:
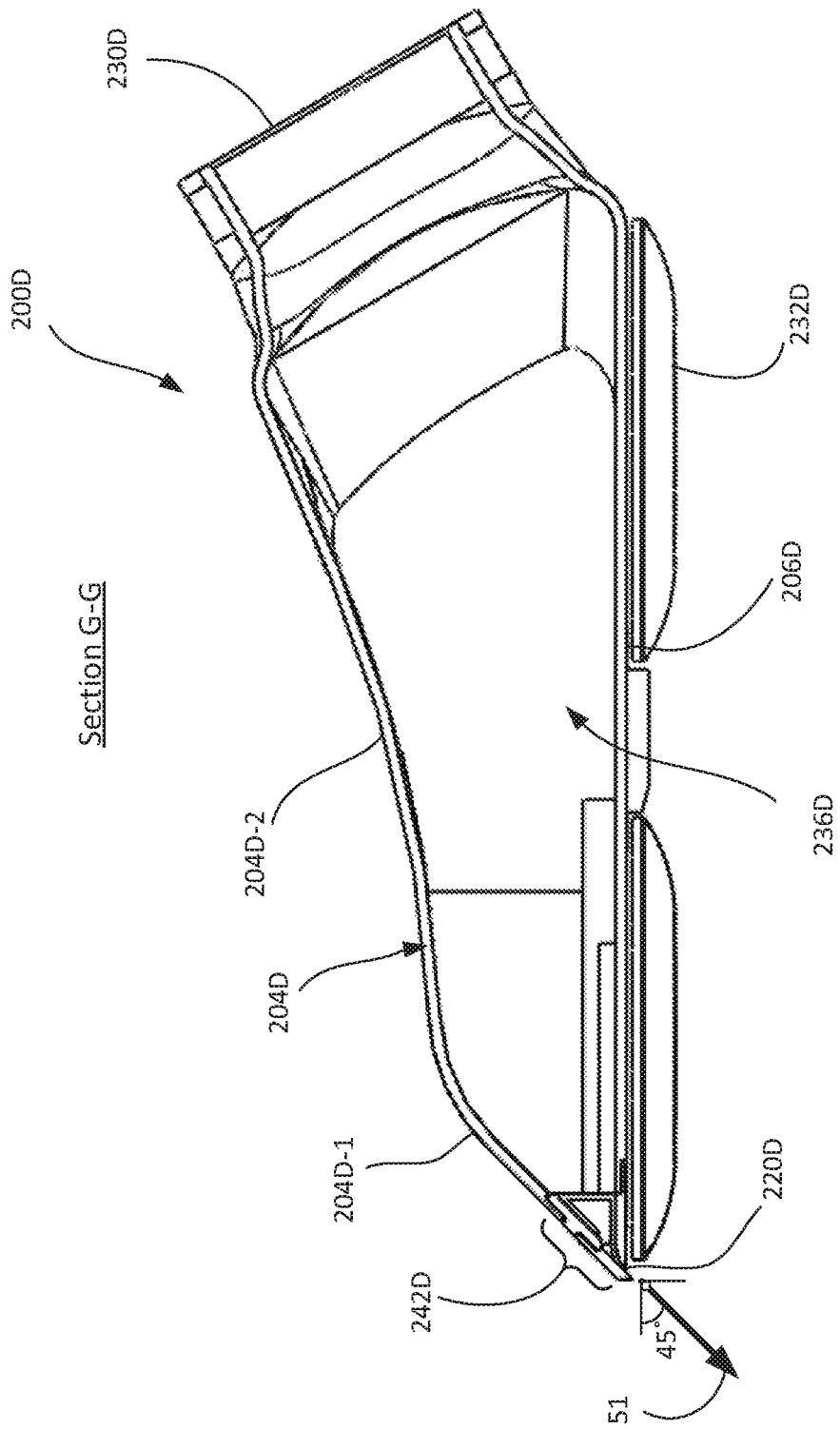
FIG. 17 is a cross-section of the debris removal wing of FIG. 15.

FIG. 16 is a frontal view of the debris removal wing 200D, indicating line of cross-section G-G, and showing air casters 232D, according to a non-limiting implementation. FIG. 17 is a cross-sectional diagram corresponding to cross-section G-G, according to a non-limiting implementation. Thus, it can be seen that whereas bottom panel 206D is shown as flat, top panel 204D, from frontal air outlets 220D to air inlet 230D, features a varying slope indicated as sloped profile 201D. The frontal portion 204D-1 of top panel 204D nearer the leading end portion 242D is steeply sloped, generally concave toward air plenum 236D, whereas central portion 204D-2 of top panel 204D is sloped less steeply and is generally concave outward.

Furthermore, leading end portion 242D is attached between frontal portion 204D-1 of top panel 204D and bottom panel 206D, and provides frontal air outlets 220D. The frontal air outlets 220D are configured to direct pressurized air from debris removal wing 200D at an angle of about 45 degrees from bottom panel 206D, indicated as blowing direction 51.

Where pressurized air is directed to operating surfaces 112A of solar modules 112 at an angle of about 45 degrees from bottom panel 206D, the pressurized air impacts the operating surfaces 112A at a point of contact of about 3 cm from frontal air outlets 220D. The pressurized air may then travel further along operating surfaces 112A for a distance. The effective range of the pressurized air clearing debris from solar modules 112 from debris removal wing 200 when debris removal wing 200 is proximate to operating surfaces 112A, in the case where the debris comprises snow, is at least partly determined by the density, moisture content, and depth of the snow on solar modules 112. In some implementations, where the snow comprises primarily low density, low moisture, powdery snow, the effective range of the pressurized air may extend from about 3 cm to about 5 m in shallow snow, about 3 cm to about 2 m in medium depth snow, and from about 3 cm to about 50 cm in deep snow. In some implementations, where the snow comprises primarily high density, high moisture snow, the effective range of the pressurized air may extend from about 3 cm to about 50 cm in shallow snow, about 3 cm to about 30 cm in medium depth snow, and from about 3 cm to about 15 cm in deep snow. In some implementations, where the snow comprises high density, high moisture snow, the effective range of the pressurized air may be further limited, where the debris removal wing 200 effectively plows the snow. The effective range of the pressurized air may be determined at least in part by angle of impact of the pressurized air on the solar modules 112.

In some implementations, the frontal air outlets 220D may be configured to direct the pressurized air about 30 to about 60 degrees from bottom panel 206D. In some implementations, the frontal air outlets 220D may be configured to direct the pressurized air about 75 degrees from bottom panel 206D. In still other implementations, frontal air outlets 220D may be configured to direct the pressurized air at or about 90 degrees from bottom panel 206D directly or substantially directly toward operating surfaces 112A.

Profile 201D may thereby facilitate transfer of debris, especially snow, over top panel 204, and facilitate gravity removal of the debris off the debris removal wing 200D.

Thus, it can be seen that delivering pressurized air from a debris removal wing maintained in proximity over solar modules can remove debris, including snow, sand, dust, and other debris from solar modules in a solar module array.

Debris may also be removed from solar modules using pressurized air directly from a blower, such as a leaf blower or a commercial debris blower, conventionally powered by a diesel, gas or electrical engine. The direct use of a blower, however, is limited in that the force of the blown air significantly decreases with increased range from the solar module being cleaned. A blower, which would generally be used at a distance from the solar modules and blows air in a cone of limited breadth, is therefore infeasible for covering a solar module array several modules wide in an efficient manner.

Pressurized air delivered from a debris removal wing maintained in proximity to solar modules provides pressurized air at close range to the debris, thus overcoming the range challenges experienced in the use of conventional blowers. Further, a debris removal wing spans a working portion of the solar module array, thus overcoming limitations of a limited cone of influence of a conventional blower. Moreover, a debris removal wing provides a low-friction body down which debris may slide where the debris is transferred on top of the debris removal wing, which may be especially useful where the debris includes wet snow.

In the case where the debris includes snow, the debris may also be removed from solar modules using a rotary brush. A rotary brush makes physical contact with the modules, causing at least three main drawbacks: First, the wear on the brushes can be significant when used in large plants. Second, maintaining an even height of the rotary brush above the modules involves careful operator control, which is a concern in many plants that have variations in the surface of the module arrays. Third, the vigorous physical contact between the rotary brushes and the solar modules may be sufficiently impactful to void some solar module manufacturer warranties. A debris removal wing hovers over the solar modules on a thin film or cushion of pressurized air, thus minimizing/avoiding significant wear of brushes, maintains an even height relative to the solar modules, and minimizes/avoids contact and possible damage to the solar modules.

Snow may also be removed from solar modules using soft surface rakes. The use of soft surface rakes, however, is manual and labor-intensive. Since snow should be removed from solar modules within 24-48 hours after a snowfall, any use of manual soft surface rakes may be costly and can lead to quality control issues, as well as increased risk of personal injury or damage to the modules since the work is done often during freezing temperatures and on slippery surfaces. A debris removal wing can be used by a single operator, or by an automated vehicle, to clear large portions of a solar module array in a timely way.

Snow may also be removed from solar modules by melting the snow using chemical agents or electrical systems built into the solar modules to heat the solar modules. Chemical agents may be harmful to the environment, as well as users, especially when used in large quantities as may be necessary in large solar power plants. Moreover, chemical melting agents may leave residue, or harshly impact surfaces of the solar modules, consequently affect solar module performance. Electrical systems add capital cost and complexity to solar plants which are already capitally intensive and complex, and reduces overall energy output from the solar modules, diminishing overall solar module power generation efficiency. A debris removal wing involves no use of chemicals and draws no electrical energy from the solar modules.

Although the implementations of the debris removal wing described above may make reference to the removal of snow from a solar module, it is contemplated that other debris including, but not limited to, hail, sleet, rain, and sand, dust, dirt, leaves, bird droppings, moss and the like can also be removed from solar modules in a manner similar to that described above. Furthermore, it is contemplated that the implementations described above may be applied to remove a variety of types of snow, including new snow, packed snow, wet snow, slush, powder snow, and other types of snow. Moreover, it is contemplated that the system or the debris removal wing described herein may be used to remove debris from surfaces other than solar modules.

Further, although the implementations of the debris removal wing described above show pressurized air being directed in a blowing direction, causing at least a portion of the pressurized air to travel along the solar modules in generally the direction of travel of the debris removal wing, it is also contemplated that the debris removal wing may include side air outlets, or frontal air outlets angled partly to the sides of the debris removal wing, providing pressurized air from the sides of the debris removal wing to further remove debris from solar modules from a width greater than the width of the debris removal wing. Further still, the debris removal wing may include bevels, or may be tapered in its side, to further facilitate debris removal. Further still, the debris removal wing may include additional appendages for removing debris from around the sides of debris removal wing. Further still, the debris removal wing may include additional sets of frontal air apertures, air nozzles, air cannons, or other devices for directing additional pressurized air along the solar modules to remove debris from the solar modules.

Further, implementations of the debris removal wing may include a water spray, projected steam, or projected dry ice, for the removal of sand, dirt, dust, leaves, bird droppings, moss, or other such debris, in any combination, projected along with pressurized air or via separate channel(s).

Further, the lower side of the debris removal wing may include additional non-abrasive brushes, including rotary brushes, to provide additional removal of debris.

While the implementations discussed herein are directed to specific implementations of the system, it will be understood that combinations, sub-sets, and variations of the implementations are within the scope of the present disclosure.

The scope of the claims should not be limited by the implementations set forth in the above examples, but should be given the broadest interpretation consistent with the description as a whole.

The invention claimed is:

1. A debris removal wing for removing debris from solar modules in a solar module array, the debris removal wing comprising:
   a body having a first side configured to be positioned proximate an operating surface of a target solar module, the body having a leading end portion having a width spanning a working portion of the solar module array;
   an air inlet in the body configured to receive pressurized air;
   a first air outlet in the body configured to direct a first portion of the pressurized air out the leading end portion of the debris removal wing in a blowing direction, the blowing direction including a first vector component parallel with operating surfaces of solar modules of the working portion of the solar module array when the wing is positioned with the first side substantially parallel and adjacent to the operating surface of the target solar module for cleaning;
   a second air outlet in the body configured to direct a second portion of the pressurized air out the first side of the body of the debris removal wing toward the operating surface of the target solar module when the wing is positioned with the first side substantially parallel and adjacent to the operating surface of the target solar module for cleaning; and
   at least one air caster disposed on the first side of the body, the at least one air caster configured for receiving and directing at least a portion of the second portion of the pressurized air from the second air outlet toward the operating surface of the target solar module to create a cushion of pressurized air between the debris removal wing and the operating surface of the target solar module when the wing is positioned with the first side substantially parallel and adjacent to the operating surface of the target solar module for cleaning.

2. A system for removing debris from solar modules, the system comprising:
   the debris removal wing of claim 1;
   an air supply connected to the air inlet configured for providing pressurized air to the debris removal wing;
   a support arm configured to support the debris removal wing proximate the target solar module; and
   a support base configured to fix the support arm to a vehicle, the vehicle operable to advance the debris removal wing along the solar module array in a leading direction.

3. The debris removal system of claim 2, wherein the support base is rotatable to position the debris removal wing on either side of the vehicle.

4. The debris removal system of claim 2, wherein the support arm comprises a control arm for articulating the debris removal wing in at least yaw and roll directions.

5. The debris removal wing of claim 1, comprising a flap configured to block blowback of debris removed from the solar modules.

6. The debris removal wing of claim 5, wherein the flap is retractable to provide a low-friction surface across the debris removal wing.

7. A debris removal wing for removing debris from solar modules in a solar module array, the debris removal wing comprising:
- a body having a first side configured to be positioned proximate an operating surface of a target solar module, the body having a leading end portion having a width spanning a working portion of the solar module array;
- an air inlet in the body configured to receive pressurized air;
- a first air outlet in the body configured to direct a first portion of the pressurized air out the leading end portion of the debris removal wing in a blowing direction, the blowing direction including a first vector component parallel with operating surfaces of solar modules of the working portion of the solar module array when the wing is positioned with the first side substantially parallel and adjacent to the operating surface of the target solar module for cleaning; and
- at least one extending member extending from the leading end portion of the body in a leading direction, the at least one extending member having a distal end curved away from the operating surfaces of the solar modules when the wing is positioned with the first side substantially parallel and adjacent to the operating surface of the target solar module for cleaning.

8. The debris removal wing of claim 7, wherein the leading end portion of the body comprises a profile tapered in the leading direction.

9. The debris removal wing of claim 7, wherein the first vector component of the blowing direction is parallel to the leading direction.

10. A system for removing debris from solar modules, the system comprising:
- the debris removal wing of claim 1;
- an air supply connected to the air inlet configured for providing pressurized air to the debris removal wing;
- a support arm configured to support the debris removal wing proximate the target solar module; and
- a support base configured to fix the support arm to a vehicle, the vehicle operable to advance the debris removal wing along the solar module array in a leading direction.

11. The debris removal system of claim 10, wherein the support base is rotatable to position the debris removal wing on either side of the vehicle.

12. The debris removal system of claim 10, wherein the support arm comprises a control arm for articulating the debris removal wing in at least yaw and roll directions.

13. The debris removal wing of claim 7, wherein the at least one extending member further comprises a non-abrasive brush configured to contact operating surfaces of solar modules.

14. The debris removal wing of claim 7, comprising a flap configured to block blowback of debris removed from the solar modules.

15. The debris removal wing of claim 14, wherein the flap is retractable to provide a low-friction surface across the debris removal wing.

16. The debris removal wing of claim 7, comprising:
- a second air outlet in the body configured to direct a second portion of the pressurized air out the first side of the body of the debris removal wing toward the operating surface of the target solar module; and
- at least one air caster disposed on the first side of the body, the at least one air caster configured for receiving and directing at least a portion of the second portion of the pressurized air from the second air outlet toward the operating surface of the target solar module to create a cushion of pressurized air between the debris removal wing and the operating surface of the target solar module.

* * * * *